(12) United States Patent
Liu et al.

(10) Patent No.: US 11,466,218 B2
(45) Date of Patent: Oct. 11, 2022

(54) CATALYTIC REACTOR APPARATUS FOR CONVERSION OF PLASTICS

(71) Applicant: Molecule Works Inc., Richland, WA (US)

(72) Inventors: Wei Liu, Richland, WA (US); Bang-Cheng Xu, Houston, TX (US)

(73) Assignee: Molecule Works Inc., Richland, WA (US)

( * ) Notice: Subject to any disclaimer, the term of this patent is extended or adjusted under 35 U.S.C. 154(b) by 0 days.

(21) Appl. No.: 17/012,995

(22) Filed: Sep. 4, 2020

(65) Prior Publication Data

US 2021/0071088 A1    Mar. 11, 2021

Related U.S. Application Data

(60) Provisional application No. 62/896,200, filed on Sep. 5, 2019.

(51) Int. Cl.
| | | |
|---|---|---|
| *C10G 1/10* | (2006.01) | |
| *B01J 35/06* | (2006.01) | |
| *B01J 29/40* | (2006.01) | |
| *B01J 35/02* | (2006.01) | |

(52) U.S. Cl.
CPC ............. *C10G 1/10* (2013.01); *B01J 29/40* (2013.01); *B01J 35/026* (2013.01); *C10G 2300/1003* (2013.01); *C10G 2300/4012* (2013.01)

(58) Field of Classification Search
None
See application file for complete search history.

(56) References Cited

U.S. PATENT DOCUMENTS

| | | |
|---|---|---|
| 6,534,689 B1 | 3/2003 | Stankevitch |
| 6,822,126 B2 | 11/2004 | Miller |
| 6,863,868 B1 * | 3/2005 | Alvin ............... B01D 39/2027 422/168 |
| 8,344,195 B2 | 1/2013 | Srinakruang |
| 8,927,797 B2 | 1/2015 | Sarker |
| 9,200,207 B2 | 12/2015 | Huang et al. |
| 9,212,318 B2 | 12/2015 | Narayanaswamy et al. |
| 9,725,655 B2 | 8/2017 | Gephart et al. |
| 2012/0261247 A1 | 10/2012 | McNamara et al. |

(Continued)

FOREIGN PATENT DOCUMENTS

| | | |
|---|---|---|
| WO | 2000066656 A1 | 11/2000 |
| WO | 2015012676 A1 | 1/2015 |

(Continued)

*Primary Examiner* — Philip Y Louie
(74) *Attorney, Agent, or Firm* — The Marbury Law Group, PLLC

(57) ABSTRACT

A catalytic reactor apparatus is disclosed for continuous conversion of plastic wastes into liquid fuels by dispersing a cracking catalyst in molten plastics and cracking plastic macromolecules into smaller hydrocarbons within boiling point range of gasoline and diesel fuel at temperatures significantly lower than thermal pyrolysis and thermal cracking. The catalyst/plastic mixing and heat transfer from the reactor wall to the reaction zone are enhanced using non-Newtonian stirrer. A catalytic membrane filter is used to keep the catalyst fines and unconverted plastic particulates inside the reactor while letting the desirable hydrocarbon vapor be withdrawn out of the reactor.

16 Claims, 19 Drawing Sheets

(56) References Cited

U.S. PATENT DOCUMENTS

| | | | | |
|---|---|---|---|---|
| 2014/0073824 A1* | 3/2014 | Jones | ................... | C10K 3/02 |
| | | | | 585/240 |
| 2017/0209829 A1* | 7/2017 | Hu | ................... | C10B 53/02 |
| 2021/0024829 A1* | 1/2021 | Magrini | ................... | B01J 27/19 |

FOREIGN PATENT DOCUMENTS

| | | | |
|---|---|---|---|
| WO | 2017103010 A1 | 12/2016 | |
| WO | 2017167947 A1 | 10/2017 | |

* cited by examiner

Catalytic cracking in catalyst/plastic interfacial area

Plastic phase
Fine catalyst particle

Long chain of plastic macromolecules are cracked into fragments $-[CH_2]_n- \rightarrow -[CH_2]_i- + -[CH_2]_j-$ Catalyst particle b. Example of non-Newtonian mixing blade Blades and shaft surfaces can be coated with a layer of ceramics Up Pumping Down Pumping a. Array of stirring blades for uniform mixing of the reaction zone Motor Axial mixing
Radial mixing
Axial mixing (b). Membrane module assembled from a group of filter plates (a) Single catalytic membrane filter plate a). Wax condensed on the reactor wall b). Leftover in the ceramic boats (a). Oil vapor from catalytic membrane filter (b). Liquid fuel condensed (b). Membrane cassette on stainless steel frame (a). Zeolite coating/porous Ni sheet

CATALYTIC REACTOR APPARATUS FOR CONVERSION OF PLASTICS

RELATED APPLICATIONS

This application claims priority to U.S. Provisional Application No. 62/896,200 entitled "Catalytic Reactor Apparatus for Conversion of Plastics", filed Sep. 5, 2019, the entire contents of which are hereby incorporated by reference for all purposes.

FIELD OF INVENTION

The present invention relates to reaction apparatus and process for conversion of plastic wastes into liquid fuels.

BACKGROUND OF INVENTION

The world produces about three hundred million tons of plastics each year. Plastic wastes has become a great concern to the environment and human society. The global recycling rate of plastics is only 6% to 9% of plastic consumption. Currently, landfill is the most common disposal method in the world for plastics. Plastics are not biodegradable. It takes many years for plastic materials to decompose. As a consequence, plastic waste is a huge contributory to environmental pollution. Incineration of solid wastes, such as plastics, tends to generate toxic air emissions. As a result, incineration is not a viable solution to the problem of plastic waste.

Molecular structures of plastics commonly used today and their relative percentage market share of the use of particular plastic types are shown in FIG. 1. Market share, melting point, and molecular structural characteristics are listed in Table 1. Polyethylene (PE), which may include high density polyethylene (HDPE), linear low-density polyethylene (LLDPE) and low density polyethylene (LDPE), polypropylene (PP), and polystyrene (PS) are made of pure C—C bonds, and account for about 70% of the total plastic output. Polyethylenterephthalate (PET) and polycarbonates (PC) contain both O—C and C—C bonds, and account for 10% of the output. These types of plastics may be cracked all the way down to single-ring aromatics. These types of plastics are premium raw materials for production of hydrocarbon fuels.

Polyvinyl chloride (PVC) plastic contains significant amounts of chlorine. Incineration, gasification, or cracking of PVC may result in potent air pollutants such as hydrocarbon chloride and corrosive hydrogen chloride gas. PVC accounts for about 17% of the plastic output and is better to be separated out and treated separately.

The other polymers, acrylonitrile butadiene styrene (ABS), polyurethane, nylons, polyamides contain significant amounts of N elements. Highly toxic C—N molecules may be produced from cracking reactions, such as hydrogen cyanide. Those polymers only account for a small fraction (3%) of the total plastic usage.

TABLE 1

List of plastics as feedstock to be studied the proposed catalytic process

| Polymer name | % Market share | Characteristic property | Melting range (° C.) |
|---|---|---|---|
| Polyethylene (PE), high density, low density | 38 | linear C—C chain | 180-270 |
| Polypropylene (PP) | 26 | linear C—C chain | 200-290 |
| Polystyrene (PS), Expanded Polystyrene (EPS) | 6 | linear C—C chain, C-aromatics | 170-290 |
| Polyethylenterephthalate (PET) | 8 | linear C—O chain, C-aromatics | 260-280 |
| Polycarbonates (PC) | 2 | linear C—O chain, C-aromatics | 280-320 |
| Polyvinyl chloride (PVC) | 17 | Significant Cl | 160-210 |
| Acrylonitrile Butadiene Styrene (ABS), Polyurethane, Nylons, Polyamides | 3 | Significant N | 190-300 |

Conversion of plastics into liquid hydrocarbons, such as transportation fuels, lubricating oils, and waxes is an attractive way to quickly dispose the plastic wastes and generate positive environmental impacts. The liquid hydrocarbons, such as gasoline and diesel fuels, are an existing market that is large enough to take extra production capacity from the plastic wastes. The melting point of most plastics is below 300° C. The plastic decomposes into smaller hydrocarbon molecules when heated above the melting point in non-oxidizing gas environment. Several thermo decomposition processes, which may also be called as pyrolysis and thermal cracking, are taught in the patent literature (see e.g., U.S. Pat. Nos. 6,534,689B1; 6,822,126B2; 8,927,797B2; 9,725,655B2; U.S. Published Patent Application No. 2012/0261247A1). However, the thermal process is typically associated with high reaction temperatures and high levels of production of side products (fuel gas, char). Therefore, effective measures for the disposal and/or conversion of plastics are desired.

SUMMARY OF THE INVENTION

An integrated reactor apparatus is disclosed for continuous conversion of plastic wastes into useful hydrocarbon products that are preferably in liquid phase at room temperature (<C4). The major components of the reactor apparatus are shown in FIG. 2. The reactor comprises a reactor vessel 1 of aspect ratio (height to diameter) greater than 1. Inside the reactor vessel, there may be three zones: a vapor phase zone 2 in a top portion; a molten plastic+catalyst reaction zone 3 in a middle portion; and a solid precipitation zone 4 in bottom of the reactor vessel 1. Inside the reactor vessel 1, there is also a mixing device 5 generating both radial and axial mixing for achieving uniform catalyst/plastic contacting and effective heat transfer between the vessel wall and interior of the molten plastic+catalyst reaction zone 3. The reactor vessel 1 may be heated on its exterior wall by a heating device 6 (e.g., reactor vessel heater). There may be at least one feed port in upper portion of the reactor vessel 1 for introduction of plastic+catalyst feedstock into the reactor via a feeder device, such as a screw feeder device 7 and feedline heater 14. There may be a catalytic filter 8 connected to the upper portion of the reactor vessel 1 to let hot oil vapor-reactor effluent 9 escape or vent out of the reactor vessel 1 while retaining of fine particulates (catalysts, chars, etc.) and/or plastic fragments (macro-molecules) inside the reactor vessel 1. On bottom of the reactor vessel 1, there may be a bottom portion discharge port 10 for discharge of the solid residuals out of the reactor vessel 1 and another purge gas port 11 for introduction of purge gas into the reactor vessel 1. There may be at least one top portion thermal couple (TC) port 12 to measure temperature profiles inside the reactor vessel 1 and at least one top portion pressure gauge (PC) port 13. The plastic and catalyst feed may be preheated via a feedline heater 14 prior to entering the reactor vessel 1.

The plastic waste may be continuously converted into the hydrocarbon product on the reactor apparatus by i) pushing the plastic+catalyst feed into the reactor vessel 1 by use of a feeder device, such as a screw feeder 7, ii) letting the plastic feed melt and crack into smaller molecules through continuous mixing and contacting with the catalyst in the molten plastic+catalyst reaction zone 3 that may be heated over a temperature range of 300 to 600° C. under nearly atmospheric pressure, iii) withdrawing hot (>200° C.) oil vapor from top portion of the reactor vessel 1 and filtering out particulates and/or macromolecules, and iv) condensing the filtered oil vapor into liquids at environmental temperatures.

DETAILED DESCRIPTION

Figure 1:
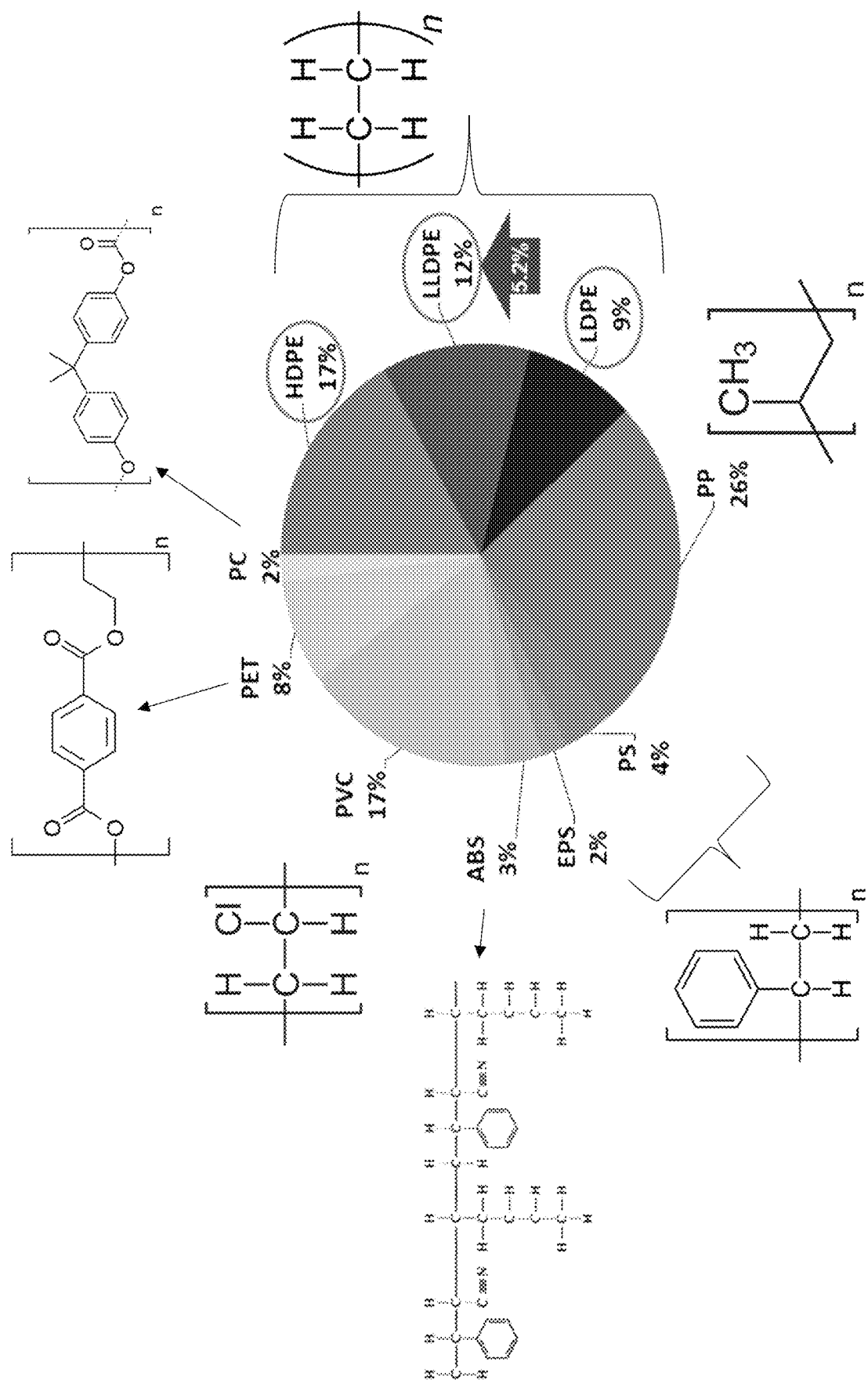
FIG. 1 illustrates the molecular structures and market share of plastics which may be used in catalytic reactors according to various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Catalytic processes are commonly used for decomposition of petroleum oil into a range of liquid hydrocarbon products in refineries. The idea of catalytic cracking or catalytic decomposition of the plastics is disclosed in several patent publications (WO2000066656A1, WO2017103010A1, WO2017167947A1, WO2015012676A1). U.S. Pat. Nos. 8,344,195B2; 9,200,207B2; and 9,212,318B2 teach the usage of dolomite, metal hydride and a supported catalyst, and fluid catalytic cracking (FCC) and ZSM-5 catalysts, respectively. Effects of catalyst addition on cracking activity and product distribution of plastic materials have been studied in many scientific publications. Various catalysts have been tested, including i) commonly-used commercial zeolite catalysts, ZSM-5, Y-type FCC, ultra-stable (US) Y-type, Beta, Ferrierite, and Mordenite; ii) inorganic materials, mud, clay, AlCl3, poly oxide acids. The reaction tests were conducted on small laboratory-scale fixed beds, fluidized beds, and autoclave reactors. The catalyst addition did show some promotional effects on conversion of PE, PP, and PS plastic into liquid-phase oils. Among those studies, the conversion temperature varied over a wide range from 200 to 600° C., and the product distribution was also varied from 80% liquid oil to 70% dry gas.

Catalytic cracking of plastics has different working mechanisms from cracking processes in oil refineries, such as FCC, wax cracking, and hydrocracking. Plastic comprises macro-molecules that are too large to get into pores of the zeolite catalyst. The solid plastics cannot be vaporized like petroleum oil fractions in catalytic and hydrocracking processes. After melting at elevated temperatures, the macro-molecules of plastics tend to tangle together and remain difficult to mix with the catalyst uniformly. Plastic is typically non-Newtonian fluids, i.e., viscosity can change when under force to either more liquid or more solid. In addition to the catalyst/plastics contacting, heat transfer is another major challenge for large plastic conversion reactors. Melting and cracking require heat supply, while plastic has low thermal conductivity and the heat transfer rate by thermal conduction from the reactor wall to interior of the reactor decreases with increasing the reactor diameter.

Figure 3A:
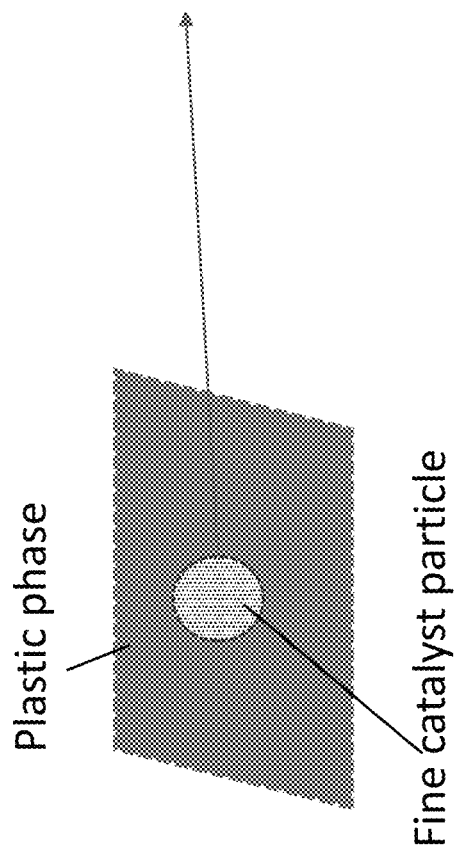
FIG. 3A is a schematic view illustrating cracking of plastic macromolecules at plastic/catalyst contact interfaces according to various embodiments.
Figure 3B:
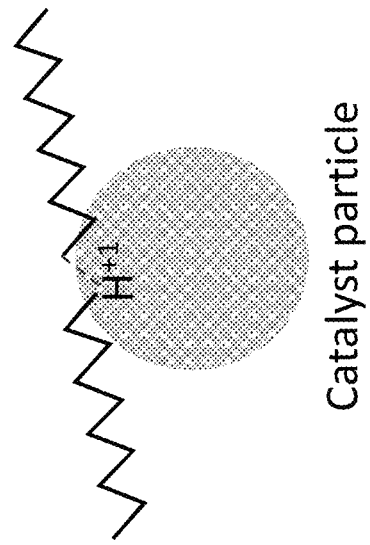
FIG. 3B is a schematic view illustrating cracking of plastic macromolecules at plastic/catalyst contact interfaces according to various embodiments.

Therefore, a new type of catalytic reactor is needed for efficient conversion of plastic wastes into useful liquid hydrocarbon products by addressing the issues of i) effective plastic/catalyst contacting, ii) effective heat supply to plastic melting and cracking; iii) separation of reacted products from the catalyst and feedstock, and iv) efficient heat integration. Such a catalytic reactor apparatus is preferably compact enough to be readily deployed and operated at processing capacity orders of magnitude smaller than conventional catalytic cracking units in oil refineries. Limited by collection, transportation, and storage of the plastic wastes, the unit processing capacity for practical applications may be much less than the oil refining process unit. Macromolecules (or polymers) of plastics typically have a size ranged from tens to hundreds of nm and are too large to enter the micropores (<1 nm) of the zeolite catalyst. Another problem is extremely slow diffusion rate of the plastic macro-molecules, as compared to rapid gas diffusion of vaporized petroleum oil in current catalytic cracking processes. The various embodiments disclosed herein teach the usage of fine catalyst particles of sizes at micrometer or sub-micrometer level. FIGS. 3A and 3B illustrates the catalytic working principle utilized by the various embodiments disclosed herein. In principle, any catalyst material of acidic sites can be used to catalyze cracking of long —C—C— chains. For example, clays, meso-porous alumina-silica metal oxide compounds, mesoporous activated alumina, porous solid acids, Y-type zeolite, beta-type zeolite, mordenite-type zeolite, and ZSM-5 type zeolite are all candidate catalysts for catalytic cracking of plastics. These zeolite catalysts listed here are used in today's catalytic cracking and hydrocracking processes in petroleum oil refineries. The Y-type zeolite is a preferred catalyst due to its low cost and relatively larger pores than the other zeolite.

In the conventional catalytic cracking process, the micrometer-sized zeolite crystals are added with binders and made into spherical beads of about 0.05 to 3.0 mm diameters or cylindrical extrudates of a diameter in the order of mm. For example, the spherical particles of average 60 micrometer are typically used in the FCC process, and the extrudates of 1-3 mm dimeter are packed in a fixed bed reactor for hydrocracking.

In contrast to engineered catalyst particles used in conventional catalytic cracking processes, the various embodiments disclosed herein utilize a fine catalyst particle or powder. In various embodiments, the fine catalyst particle, which can be zeolite crystals, may be dispersed on the plastic matrix to initiate catalytic reactions at contacting spots of the catalyst/plastics (FIG. 3). The long —C—C— chains may be first cracked by acidic sites (H+1) on the catalyst outer surface into fragments of sizes smaller enough to diffuse into micropores inside the zeolite particle and further cracked into desirable sizes of hydrocarbon molecules, such as gasoline and diesel fuel. With polyethylene (PE) as an example, the catalytic cracking reaction process is described as follows:

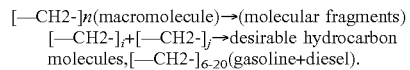
[—CH2-]$_n$(macromolecule)→(molecular fragments)
[—CH2-]$_i$+[—CH2-]$_j$→desirable hydrocarbon
molecules,[—CH2-]$_{6-20}$(gasoline+diesel).

The desirable hydrocarbon products have the boiling point low enough to be withdrawn from an embodiment catalytic reactor in vapor phase.

At high temperatures, pyrolysis or thermochemical reactions of the long-chain plastic molecules may occur significantly and result in formation of low-value or non-usable products through the following side reactions:

[—CH2-]$_n$→Coke+H$_2$

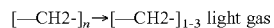
[—CH2-]$_n$→[—CH2-]$_{1-3}$ light gas

One type of side reaction is condensation of the hydrocarbon molecules into coke (or char) and concomitant production of hydrogen gas. Another type of side reaction is deep cracking of the long-chain hydrocar the coke (or char) and fuel gas (H$_2$ and C1-C3 mixtures).

To make the desirable catalytic cracking reactions prevail over the side reactions, the catalyst/plastic interfacial area should be maximized, and the catalytic reaction may be conducted under the controlled temperature over a range of 250 to 600° C. The catalytic reaction rate could be too low to be practical in instances in which the temperature is below 250° C. In instances in which the temperature is too high, such as above 600° C., the catalytic reaction zone may be dried up and non-catalytic reactions prevail. The catalytic reaction is preferentially conducted in the molten plastic because the catalyst/plastic contacting in liquid phase can be intensified by effective mixing and the catalyst dry-up can be avoided in liquid phase.

The various embodiments implement a second approach to maximizing the catalyst/plastic contacting area. In particular, the various embodiment may increase the catalyst/plastic volume ratio inside an embodiment catalytic reactor is one approach toward maximizing the catalyst/plastic contacting area. However, the plastic should be a continuous phase in the reaction zone and the catalyst/plastic volume ratio should to be less than 1. The second approach is to reduce the catalyst particle size. The specific external surface area (SAv) of a catalyst particle increases in inverse first order to the particle size (lp) as described by the following equations:

$$SA_v = \frac{\text{Area}}{\text{Volume}} = \frac{6}{l_p}$$

The 1 μm-size particle provides a catalyst/plastic contacting area 100 times of the 100 μm-particle. Decreasing the catalyst size may have more significant impact on the catalytic reaction than increasing the catalyst/plastic volume ratio. The catalyst particle used in the catalytic reactor of various embodiments may be preferably less than 100 μm, more preferably less than 10 μm. Most zeolite materials are synthesized as crystals of micro and sub-micrometer sizes. Thus, the as-synthesized powder may be directly used for the present reaction process without forming engineered particles. The as-synthesized zeolite crystals may exist as agglomerates. The agglomerates can be broken up into micro-sized particles by milling. The other non-zeolite catalyst particles, such as clays and alumina-silica, may also be milled into micro-sized particles.

The various embodiments implement a third approach to maximizing the catalyst/plastic contacting. In particular, the various embodiments implement effective mixing of the molten plastic and catalyst in the molten plastic+catalyst reaction zone 3. Vigorous mixing inside the molten plastic+catalyst reaction zone 3 keeps the fine catalyst particles stay dispersed in the plastic matrix as the molten plastic is converted and new feed is added. Mixing may also provide enhanced heat transfer between the catalytic reactor vessel wall and molten plastic+catalyst reaction zone 3.

The plastic melting and catalytic cracking reaction are endothermic. The thermal energy for the melting and catalytic cracking reaction may be supplied to the molten plastic+catalyst reaction zone 3 to keep the desired reaction temperature. The reactor vessel wall may be heated up to serve a source of thermal energy. The various impacts due to the reactor diameter, thermal conductivity, and reaction rate on the temperature on the temperature profile are discussed using the following equation describing thermal conduction in a cylindrical reactor vessel:

$$k\left(\frac{d^2T}{dr^2} + \frac{1}{r}\frac{dT}{dr}\right) = R_p \cdot (\Delta H_m + \Delta H_R)$$

Let $$\theta = \frac{T}{T_w}, \xi = \frac{r}{r_0}$$

$$\frac{d^2\theta}{d\xi^2} + \frac{1}{\xi}\frac{d\theta}{d\xi} = \frac{R_p \cdot (\Delta H_m + \Delta H_R)}{T_w} \cdot \frac{r_0^2}{k}$$

$$\alpha = \frac{R_p \cdot (\Delta H_m + \Delta H_R)}{T_w} \cdot \frac{r_0^2}{k}$$

Where T=temperature at radius=r; $T_w$=vessel wall temperature; k=thermal conductivity of the media in the reaction zone, W/(m·K); $r_0$=radius of the reactor vessel, m; $R_p$=plastic conversion rate, mol/(s·m³); $\Delta H_m$=heat of plastic melting, J/mol; $\Delta H_R$=heat of plastic cracking reaction, J/mol.

The parameter, α, determines steepness of temperature decrease from the vessel wall toward the center. The smaller α is, the less temperature decrease along the radial direction. The α parameter is determined by the plastic reaction rate, vessel radius, thermal conductivity, and the wall temperature. Given the wall temperature, heat of the melting, and heat of the reaction, α parameter is determined by the reaction rate, reactor radius, and thermal conductivity. The thermal conductivity of zeolite+plastics composite is in the range of 0.1 to 0.4 W/(m·K), which is about two orders of magnitude less than stainless steel materials. Given the plastic+catalyst material system, thermal conductivity is fixed. α parameter indicates importance of reactor radius (size) to radial temperature distribution. If the reaction rate is kept constant, α parameter increases with reactor radius in second power order, indicating that the temperature rapidly decreases along radial direction for large-size reactor. Thus, heat transport by thermal conduction is not sufficient for large reactors. For the large reactor, heat transfer from the reactor wall to the reactor zone needs to be promoted dramatically to keep the reaction rate be same as in the small reactor.

Figure 4B:
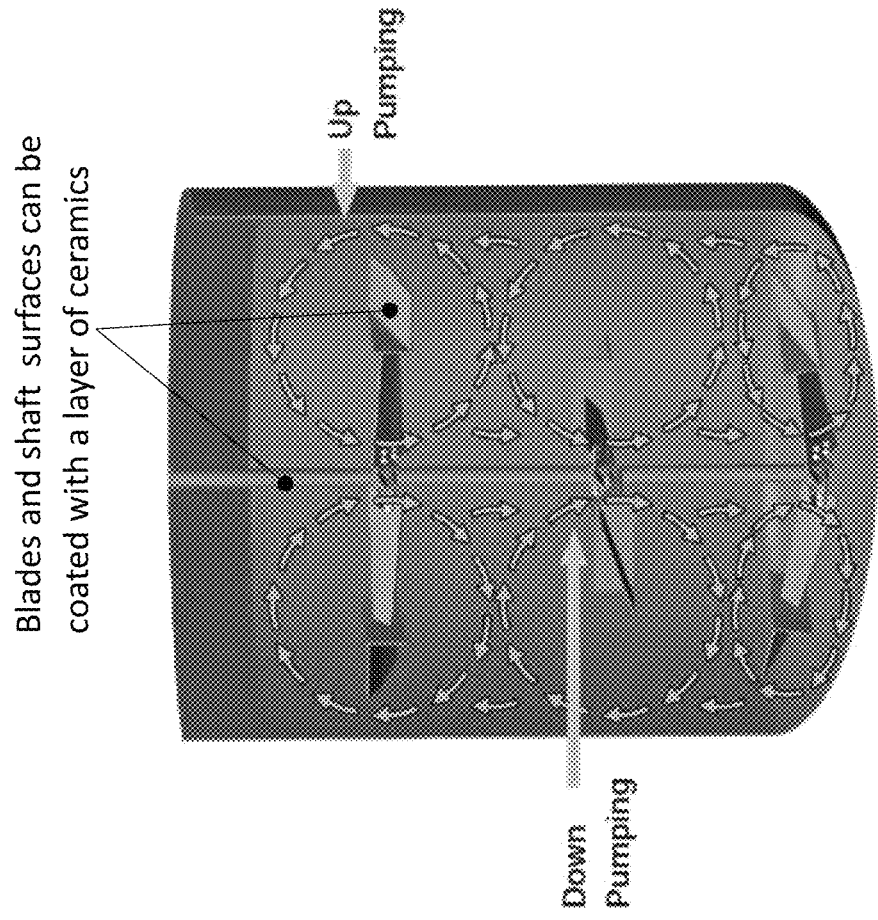
FIG. 4B is a perspective view illustrating a non-Newtonian mechanical stirrer according to various embodiments.
Figure 4A:
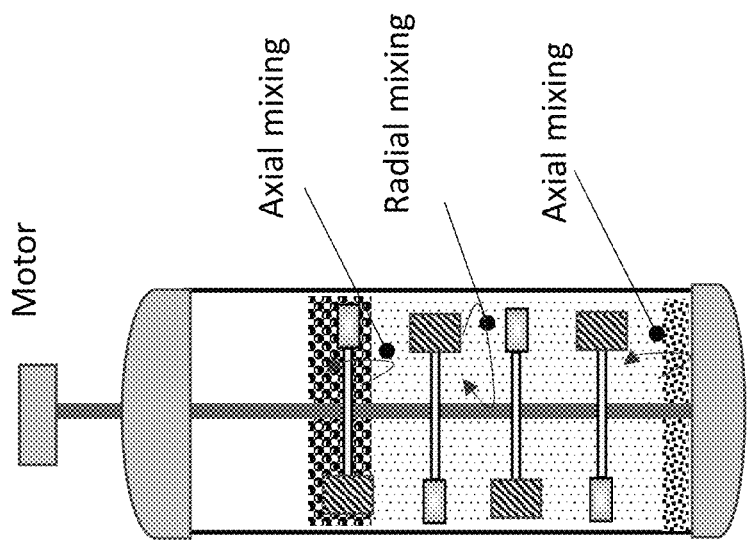
FIG. 4A is a schematic view illustrating a non-Newtonian mechanical stirrer according to various embodiments.

In various embodiments, the heat transfer may be intensified by use of mechanical stirrer or agitator. Examples of embodiment stirring methods are illustrated in FIGS. 4A and 4B. For example, as shown in FIG. 4A, an electrical motor-driven shaft positioned in the centerline of the reactor vessel 1 may provide stirring or agitation of the molten plastic and catalyst. As shown in FIG. 4B, an array of stirring blades for non-Newtonian fluids may be mounted on the shaft. The fluid motion may be induced when the shaft is rotated. The blades may be configured in such a way that no dead or stagnant spaces are left in the reaction zone. As illustrated in FIG. 4A, radial mixing in the middle portion of the reaction zone enhances heat transfer from the reactor wall to interior of the molten plastic+catalyst reaction zone 3, axial mixing in the top of the reaction zone promotes introduction of fresh feed into the molten plastic+catalyst reaction zone 3, and axial mixing in the bottom of the molten plastic+catalyst reaction zone 3 mitigates settling of the catalyst particles out of the molten plastic+catalyst reaction zone 3 and into the precipitate zone 4. Molten plastics are typically non-Newtonian fluid. In non-Newtonian fluids, viscosity can change when under force to either more liquid or more solid. By contrast, mixing intensity of Newtonian fluids increases with rotation speed. One important feature for effective catalyst/molten plastic mixing is to control the rotation speed within a suitable range, such as 10 to 200 rotations per minutes (RPM). Excessively high RPM can have negative impacts on the catalyst/plastic mixing. In an embodiment, non-Newtonian-type blades may be used for the catalyst/plastic mixing, as illustrated in FIG. 4B. The stirring blades may be oriented at 90-degree angle to break up the fluid. High shear mixers are another mechanical stirring method that may be implemented. The high-shear mixer disperses the catalyst particles into a main continuous phase of liquid plastic and breaks up the plastic agglomerates.

The shaft and blades of the mixers may be made of any suitable material, such as metal alloys, such as stainless steel. The metallic surface can be coated with a layer of durable ceramic materials, such as alumina and zirconia, to increase its service time and reduce power consumption. Metallic surfaces can be worn out by the fine catalyst particle in the molten plastic+catalyst reaction zone 3. Alumina and zirconia materials are harder than the catalyst. The ceramic coating protects the metallic surface from wear. Hydrocarbon materials tend to coke on the metal surfaces at high temperatures. Accumulation of coke on the shaft and blade surface may reduce its mixing effectiveness and increase the driving power consumption. The ceramic material may have coke-resistance. The ceramic coating may minimize formation of coke or char on the shaft and blades. The plastic wastes may contain chlorine, nitrogen, and sulfur elements that can be converted into corrosive gases, such as ammonia and hydrogen chloride. The ceramic coating may protect the metal from corrosion by these reactive gases.

In the molten plastic+catalyst reaction zone 3, the plastic may be cracked into hydrocarbon product molecules that are in vapor phase under the reaction conditions, called as oil vapor. The desirable hydrocarbon product has a boiling point preferably less than 400° C., more preferably less than 360° C. (~boiling point of diesel fuel). The oil vapor rises out of the molten plastic+catalyst reaction zone 3 and may be discharged from the top section of the reactor vessel. The fine catalyst particulates, plastic fragments, and liquid-phase cracked products may be entrained by the oil vapor. Direct discharge of those entrained materials can result in a complex product mixture that needs to be separated and reprocessed to become saleable products, and loss of the catalyst. These issues are mitigated by i) having a free space in a top portion of the reactor vessel to let the solid and liquid droplets segregate from the oil vapor by gravity and ii) installing a catalytic filter.

Figure 5:
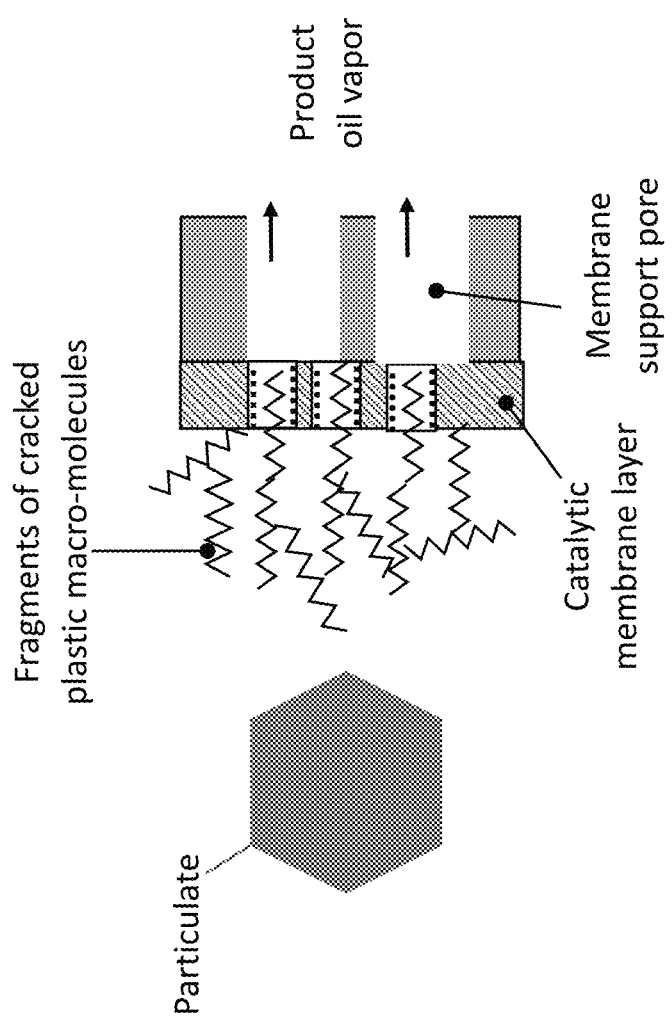
FIG. 5 is a cross-sectional view illustrating a catalytic membrane filter for blocking particulates and passing desired hydrocarbon products according to various embodiments.

FIG. 5 illustrates the working mechanism of the catalytic filter 8. The catalytic filter 8 may have surface pore sizes small enough to exclude the catalyst fine particles. In other words, the catalyst particle and other particulates of similar sizes may be blocked on an exterior surface of the membrane filter. Since the micrometer-sized catalyst particle is used, the filter membrane surface pore size is preferably less than 1 micrometer. The catalyst fines and plastic fragments excluded by the membrane filter can be sent back to the catalytic reaction zone. The examples of such membrane filtering materials are the porous metal sheet developed by Molecule Works Inc. and ceramic membrane tubes. Furthermore, the membrane filter contains cracking catalysts that can crack the entrained liquid-phase oil such as waxes into desirable oil vapor. Y-type and ZSM-5-type zeolite materials of high cracking activity can be loaded into the membrane filter to conduct simultaneous filtration and cracking reactions. The catalytic membrane filter can be made of graded pore structures, i.e., the membrane surface exposed to particulate-laden vapor has smaller pore sizes than the membrane supporting structure.

Thermally and chemically durable membrane supporting structures may be needed to conduct hot oil vapor filtration. The supporting structure is preferably made of metal and ceramics. Examples of the supporting structures are porous metal sheets, metal foams, fine metal meshes, porous metal tubes, porous ceramic plates, and porous ceramic tubes. The active catalyst can be added inside pores of the support structure that is exposed to the feed gas or deposited as a separate layer. The cracking catalyst can be loaded into the supporting structure by coating and/or hydrothermal growth.

The residence time of the oil vapor in the catalytic filter 8 or contact time of the oil vapor with the catalyst should be controlled less than 1 second, preferably less than 0.1 second. As defined by the following equation, the resistance time can be controlled by the catalyst layer thickness (lcat) and vapor flow velocity ($V_m$):

$$\tau_m == \frac{l_{cat}}{V_m}$$

The vapor velocity is defined as follows:

$$V_m == \frac{Q_f}{SA_m}$$

Where Qf is the vapor flow rate passing through the membrane filter, m$^3$/s; $SA_m$ is the surface area of membrane exposed to the oil vapor, m$^2$.

The catalytic membrane filter provides performance characteristics of i) stability under the catalytic filtering conditions (up to 400° C., oil), ii) mechanical integrity under a pressure gradient applied to the membrane sheet (up to 1 bar), iii) thermal shock resistance during the filter heating up and cooling down, iv) high filtering efficiency such as 99% removal of particulates greater than 1.0 μm; and (v) sufficiently high flux, preferably >10 kg/m$^2$/h.

Figure 6B:
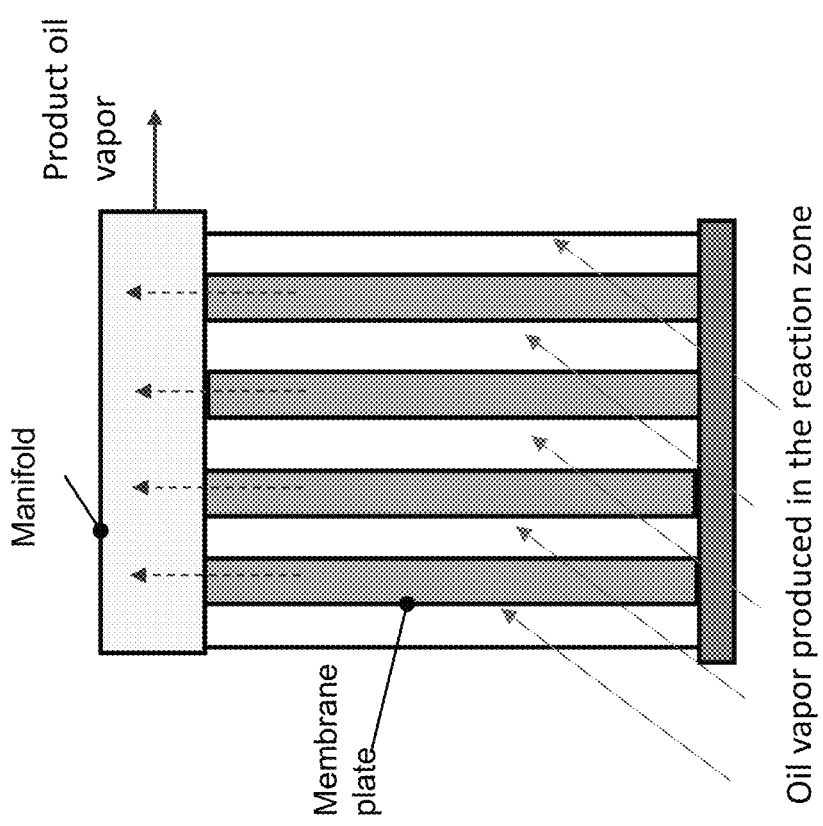
FIG. 6B is a schematic view illustrating an array of cassettes of catalytic membranes according to various embodiments.
Figure 6A:
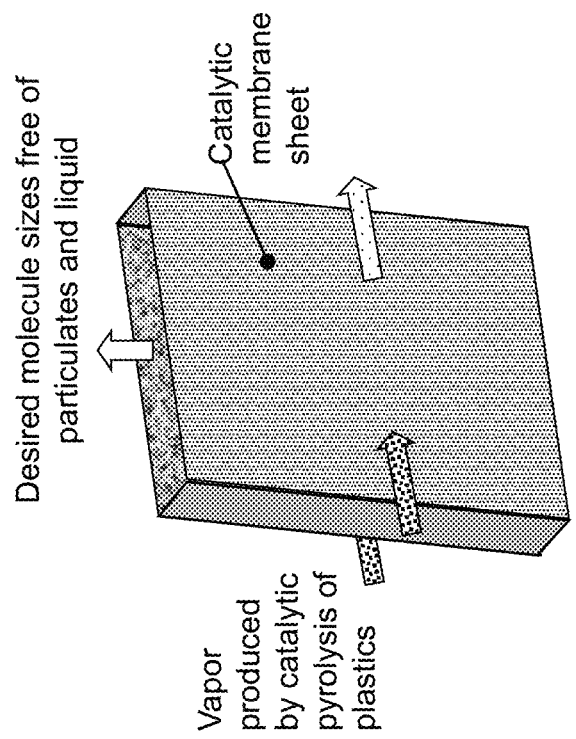
FIG. 6A is a perspective view illustrating a catalytic membrane filter in cassette-type module configuration according to various embodiments.

FIG. 6A illustrates an example of plate-type membrane filter device. Two catalytic membrane sheets may be packaged on a stainless-steel frame to form a cassette (plate). There may be permeation channels inside the cassette, while the exterior surface exposed to the feed gas. The open surface of the membrane cassette allows the oil vapor to flow over freely and minimizes trap of debris and other inert particulates on the membrane surface. A group of the membrane plates can be assembled to form a module as illustrated in FIG. 6B. The raw oil vapor is introduced into the membrane from the open channels between the membrane plates. One feature for the catalytic filter is back-flush ability. The membrane may be periodically cleaned by blowing purge gas into the reactor vessel. The back flushing can be conducted by reversing the membrane permeation flow and/or reversing the oil vapor feed flow. In the former, the membrane surface is blown from the back side of the membrane. In the latter, the membrane surface is blown through the channels between the membrane plates. The back flushing is typically conducted in a short period of time relative to the filtration. The back-flush gas can be i) steam, ii) fuel gas, and iii) nitrogen gas. The particulates dislodged from the membrane surface may be sent back to the reaction zone. If the catalyst is slightly coked, the back flush with steam or $O_2$-containing nitrogen gas can oxidize the coke.

Figure 2:
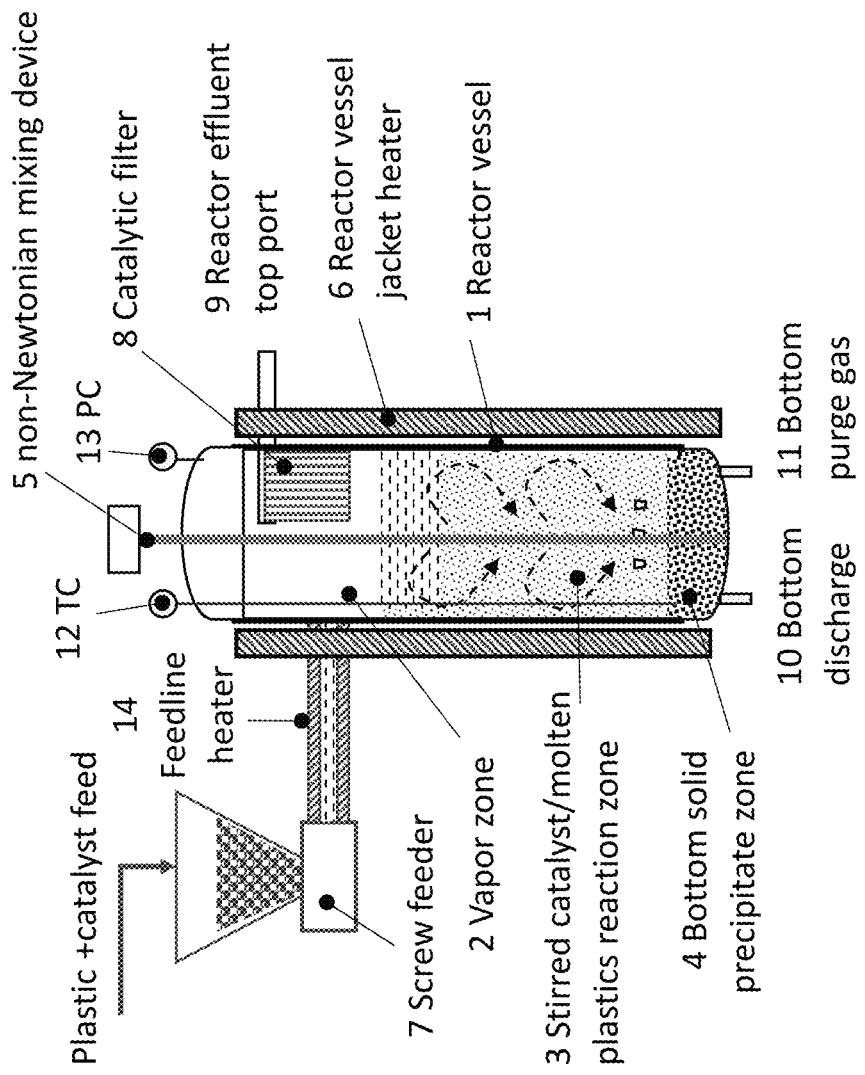
FIG. 2 is a schematic view of an integrated catalytic reactor for continuous conversion of plastics into hydrocarbon products according to various embodiments.
Figure 7:
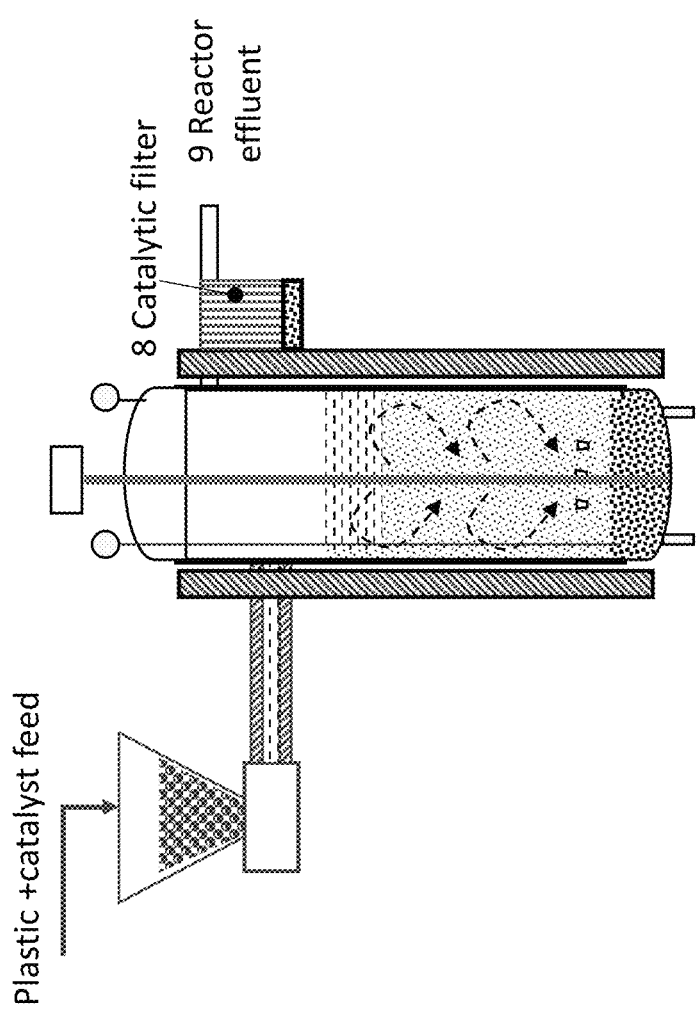
FIG. 7 is a schematic view illustrating the attachment of catalytic filter to the outside of a reactor vessel according to various embodiments.

The catalytic membrane filter 8 can be installed inside the reactor vessel 1 (see e.g., FIG. 2) or outside the reactor vessel (FIG. 7). In embodiments in which the catalytic membrane filter 8 is installed within the reactor vessel 1, no insulation is needed, the particulates may fall back to the reaction zone by gravity. However, installation of the catalytic membrane filter 8 within the reactor vessel 1 may congest the reactor space. In embodiments in which the catalytic membrane filter 8 is installed outside the reactor vessel 1, the catalytic membrane filter 8 can be readily replaced. However, the catalytic membrane filter 8 must be well insulated to keep the catalytic membrane filter 8 hot and the entrained particulates need to be handled separately.

It is expected that the catalyst inside the reactor vessel 1 gradually deactivates due to various reasons, such as agglomeration, coking, and poisoning. Fresh catalyst may be continuously added with the plastic feed back into the reactor vessel 1. The deactivated catalyst and inert particles may be discharged from the reactor vessel bottom discharge 10. During startup and shutdown, purge gas may be introduced from the reactor bottom via a purge gas 11 port. For example, fuel gas may be used to heat up the reactor during startup, and steam or nitrogen gas may be used to remove the reactive species during reactor shutdown. Thus, the bottom section of the reactor vessel may be configured to separate and discharge the solids, and to introduce and distribute the purge gas.

For effective arrangement of three different sections, the reactor vessel 1 is preferred to have high aspect ratio. The ratio of height to diameter may be greater than 1, preferably greater than 2. The reactor vessel 1 may be made of stainless steel or any suitable material. The interior wall of the reactor vessel 1 may be coated with a durable ceramic layer, such as alumina and zirconia, to protect the metal surface from coking and from attrition by the particulates. Due to distinctive functionalities in the three sections of the reactor vessel, temperature profiles along the reactor height may be measured and controlled separately. The top and bottom sections account for about 20-30% and 10-30% of the reactor vessel length, respectively. The reactor vessel 1 of present embodiment may be designed compact enough to be transported by regular trucks as prefabricated equipment so that onsite engineering cost may be reduced. Thus, in an embodiment, the reactor vessel diameter may be less than 3 meters, preferably less than 2 meters. For a compact reactor, a multi-point thermocouple probe may be inserted into the reactor vessel from the top cover to measure temperatures at different height of the reactor. Making many ports along the reactor height for thermocouple probes adds the reactor fabrication and installation costs. The reactor operating temperature may be within a range of 200 to 600° C. The middle section reaction zone may be kept at higher temperature than the bottom and top sections. The reaction zone temperature is preferably within 300 to 600° C. The reaction temperature may be adjusted according to the feedstock. Overall, excessively high temperatures should be avoided to minimize thermal pyrolysis and thermal cracking reactions. The catalytic reactor is preferably operated at low pressures, preferentially lower than 3.0 bara. Adequate pressure is desirable for filtering of the hot oil vapor and subsequent product separation. The reactor pressure is measured at the top and bottom of the reactor vessel. The difference between the pressure at the top and the bottom of the reactor vessel indicates the static pressure of the reactor inventory.

In various embodiments, the preferred plastic feedstock includes polyethylene (PE), polypropylene (PP), polystyrene (PS), polyethylenterephthalate (PET), and polycarbonates (PC) in decreasing order of preference. In total, these types of plastic account for about 80% of today's plastic usage. PE, PP, and PS are made of pure C—C bonds, and all premium feedstock to production of hydrocarbon fuels. PET and PC contains significant fraction of oxygen element and single-ring aromatics. The PET and PC macromolecules can be cracked into single-ring aromatics within boiling point range of gasoline. A fraction of oxygen elements may be converted into CO and $CO_2$, while C—O bonds are likely to remain in the cracked products. The removal of oxygen from C—O bonds requires catalytic hydrogenation reaction, which could not be met with C—C cracking reactions. The aromatic oxygenates can be high octane gasoline blends. But aromatics is not desired for diesel fuels. If the PET and PC are co-processed with PE, PP, and PS as a minor constituent, the minor fraction of oxygenate and aromatics may be acceptable to fuel blends. However, if PET and PC are processed as a major constituent of the feedstock, the catalytic deoxygenation function should be added. For example, a small hydrogenation reactor may be used to hydrogenate the cracked liquid oil, or the hydrogen and hydrogenation catalysts are added into the cracking reactor.

The remaining 20% plastics containing C—Cl and C—N are not preferred the feedstock. It is preferred that plastics containing C—Cl and C—N be separated out or treated separately. They include Polyvinyl chloride (PVC), Acrylonitrile Butadiene Styrene (ABS), Polyurethane, Polyamides, and Nylons. PVC accounts for 17% of today's plastic output, while the plastics containing C—N bonds account for about 3%. The C—C bonds of those plastic molecules can be cracked as the other plastics. However, some toxic gas or molecules may be produced from those plastics. For example, hydrocarbon chlorides and HCl can be produced from cracking and pyrolysis of PVC. The hydrocarbon chlorides gases are toxic and HCl is corrosive. The hazardous and toxic gas and chemical, such as such as HCN—hydrogen cyanide, can also be produced from breakdown of C—N— containing plastics.

The plastic wastes may contain a variety of possible contaminants. Zeolite is preferred cracking catalysts because of its low cost and ruggedness. Some of the organic matters, such as grease, fat, and oil, can be cracked on the zeolite catalyst. Some of the inorganic matters, such as soil, sand, ceramics, metals, glass, rocks, are typically inert to the zeolite cracking reaction. The clay constituents in the soil have moderate cracking activity. Some of the biomass matters, such as papers, woods, and grass, are likely to be partially pyrolyzed and charred. The un-converted solids along with agglomerated catalyst particles are expected to settle down and be discharged from the reactor bottom.

Figure 8:
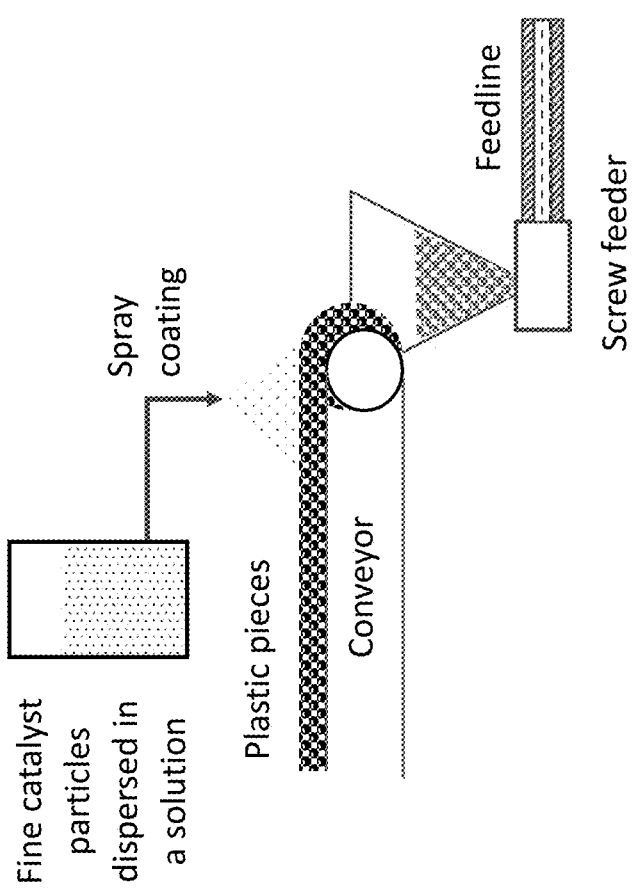
FIG. 8 is a schematic view illustrating a catalyst+plastic feeding method according to various embodiments.

The plastic feedstock should be properly prepared to operate the reactor with high throughput, yield, and energy efficiency. The solid plastic wastes are broken into pieces or chips that can be handled by the feeder. The plastic fragments can be separated from other solid materials of higher density, such as metals, rocks, glasses, and sands, by air classification. Hot air, which can be heated by use of waste heat from the reactor effluents, may be used for the air classification and feed drying at the same time. FIG. 8 shows one example of the catalyst+plastic feed system. The micro-sized zeolite catalyst powder is dispersed in a solution by ball milling, attrition milling or shear mixer. The solution can be hydrocarbon oils, such as diesel fuels. Plastic pieces are delivered to the screw feeder hopper by a conveyor. The catalyst solution may be sprayed onto the plastic to disperse the fine catalyst particle on the surface of the plastic. The catalyst+plastic may be fed into the reactor vessel by a screw feeder. In the screw feeder, the plastic chips get densified and further mixed with the catalyst. The feedline can be heated to get plastic melted or partially melted prior to entering the reactor. Physical mixing of fine catalyst particles with plastic fragments may be difficult because vastly different physical and chemical properties of the two kinds of materials. Since the oil may be wettable on the plastics, spray coating may be a simple process to disperse the catalyst fines on the plastic surface.

Figure 9:
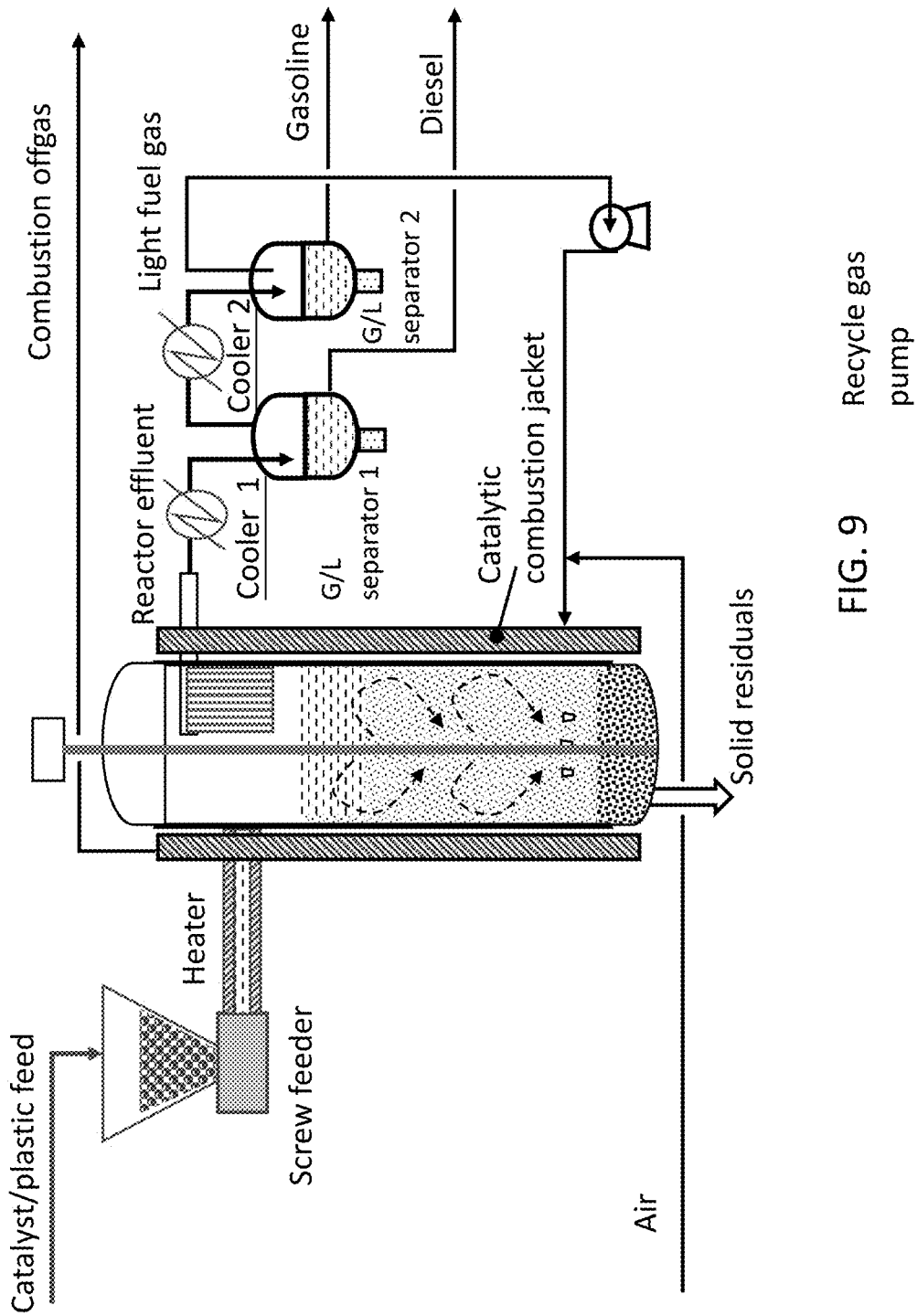
FIG. 9 is a schematic view of a reactor apparatus with a gas/liquid separator for product separation and recovery according to various embodiments.
Figure 10:
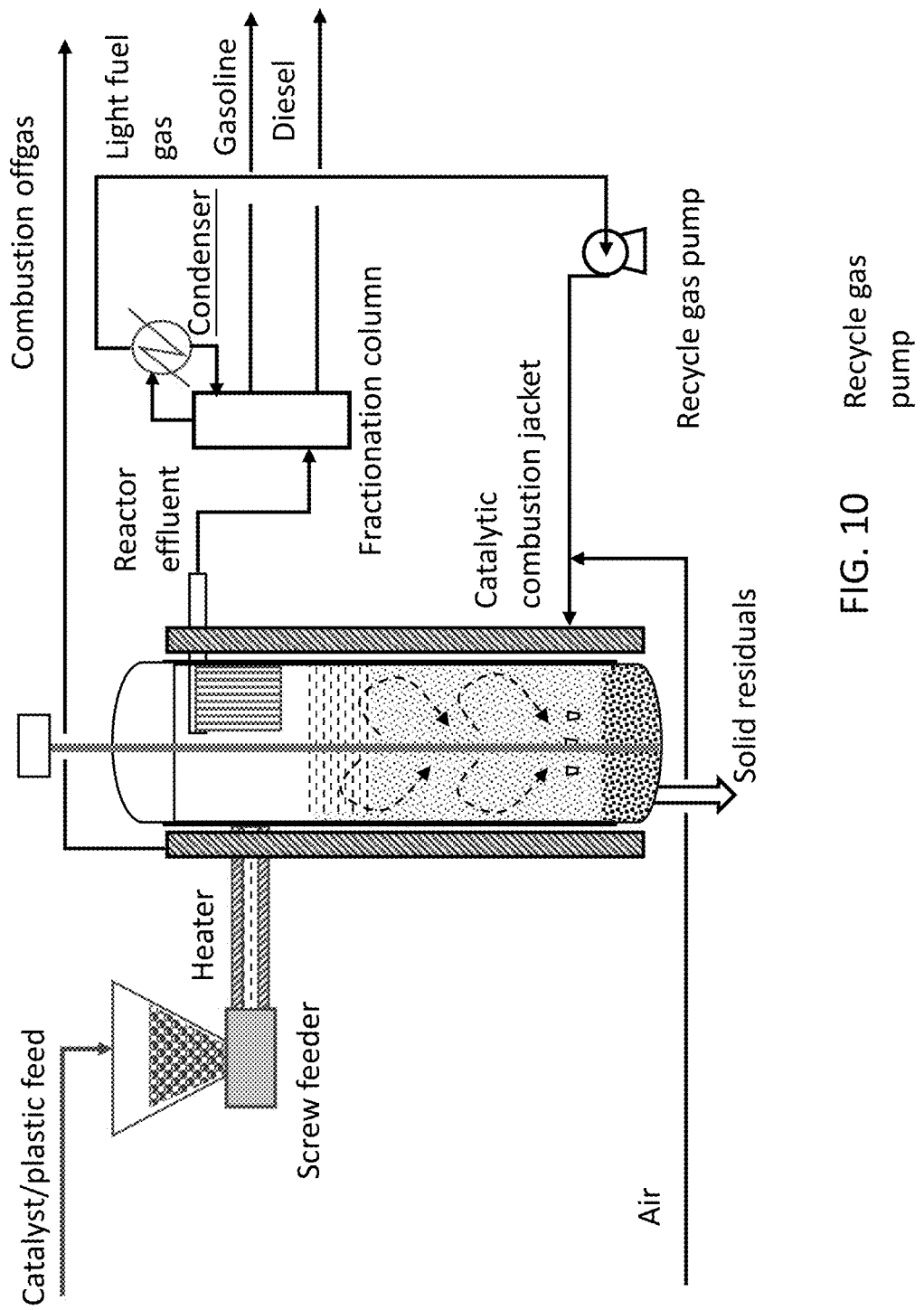
FIG. 10 is a schematic view of a reactor apparatus with a fractionation column for product separation and recovery according to various embodiments.
Figure 18:
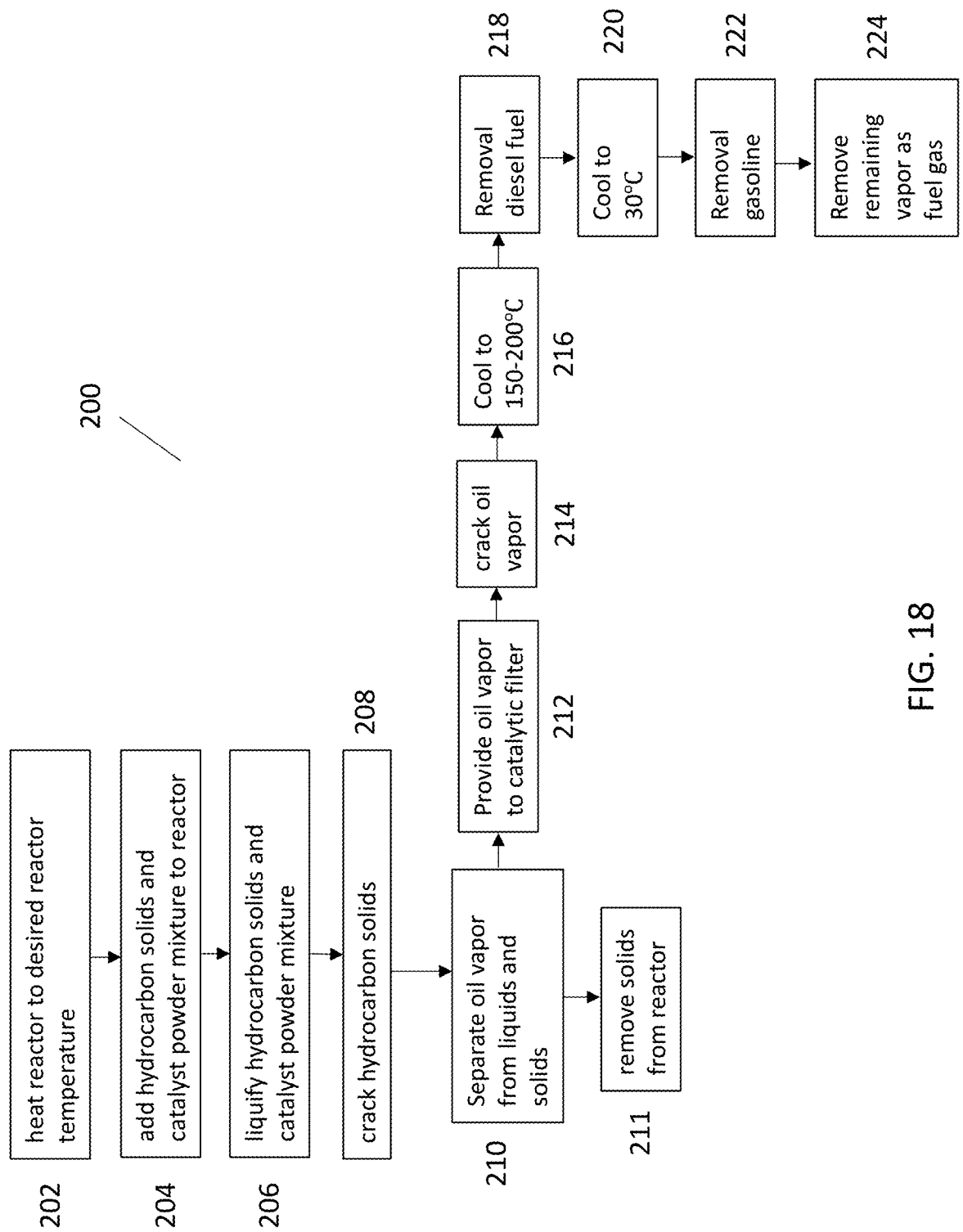
FIG. 18 is a flow diagram illustrating a method of separating fuel products according to various embodiments.
Figure 19:
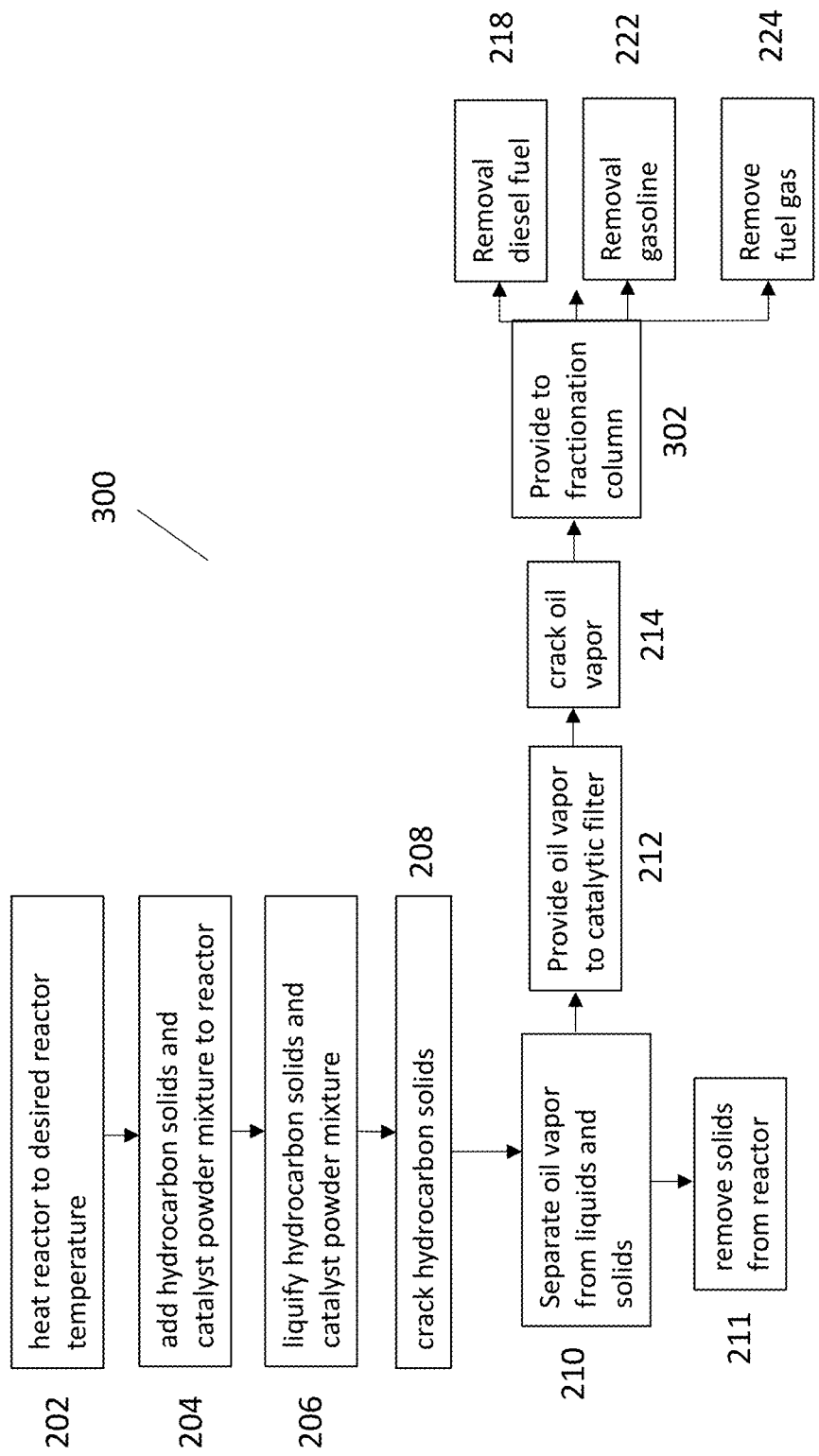
FIG. 19 is a flow diagram illustrating an alternative method of separating fuel products according to various embodiments.

The plastic catalytic cracking process is illustrated with two different product separation processes 200, 300 in FIGS. 9 and 10, respectively. FIGS. 18 and 19 are flow diagrams corresponding to the separation processes illustrated in FIGS. 9 and 10, respectively. When the reactor vessel 1 reaches the designated reaction temperature, step 202, the catalyst and plastic feedstock may be fed, step 204, into the reactor vessel 1 at a designated flow rate while the molten plastic+catalyst reaction zone 3 may be under continuous stirring. The feedstock may be introduced into the reactor vessel 1 from top section of the reactor vessel 1, the feedstock gets into the molten plastic+catalyst reaction zone 3 by agitation, melted, step 206, and cracked into oil vapor, step 208, over a temperature range of 300 to 600° C. and at a residence time of 0.2 to 2 hours. The residence time may be calculated by dividing the reaction zone volume (m³) with the plastic volumetric feed rate (m³/h).

As the plastic feedstock solids are cracked by its reaction on and in the catalyst, oil vapor may begin to separate from the molten feedstock and the solids, step 210. The deactivated catalyst and inert solids may be periodically discharged, step 211, from the reactor bottom through a bottom discharge port 10. Such deactivated catalyst and inert solids may be disposed by landfilling or reclaimed by a separate process. The zeolite catalysts can be activated by washing away the poisons and/or burning off the coke.

The oil vapor rises to the top section of the reactor and goes through a catalytic membrane filter 8, step 212. The entrained catalyst and other particulates may be rejected by the catalytic membrane filter 8 and fall back to the reaction zone by gravity. The entrained liquid droplets may be cracked into the oil vapor, step 214. After the oil vapor comes out of the catalytic membrane filter 8, the products can be separated and collected by two process methods.

In the process flow diagram shown in FIG. 9, the hot oil vapor may be cooled down to about 150-200° C., step 216, to condense the liquid fuels within the boiling point range of diesel fuel, step 220. The remaining hot oil vapor may be further cooled down to about 30° C., step 222, to condense the liquid fuel within boiling point range of gasoline, step 222. The remaining uncondensed vapor can be removed as fuel gas that can be used to supply the heat to the reactor vessel, step 224.

Due to the compactness of the present reactor equipment, a mini- or micro-channel catalytic oxidation jacket can be made and attached to the external wall of the reactor vessel. The fuel gas may be oxidized by air into water and carbon dioxide in the jacket. The jacket comprises an arrangement of flow channels coated with combustion catalysts. The heat of combustion may be used to heat up the reactor vessel. Compared to the conventional furnaces, the catalytic jacket heating may be very compact and energy efficient. Alternatively, the reactor vessel 1 can be heated up by electrical heaters, which can consume significant amounts of electrical power. The thermal energies rejected by the cooler and condenser can be used to preheat and dry the plastic feedstock. With the present process design, thermal energy of the plastic is fully utilized while environmental emission is minimized.

In the process flow diagram shown in FIGS. 10 and 19, steps 202 to 214 are the same as in the process flow previously described in regards to FIGS. 9 and 18. However, in this embodiment, the hot oil vapor coming out of the catalytic filter 8, step 214, may be separated on a fractionation column, step 302, into fuel gas (step 224), gasoline (step 222), and diesel fuel (step 218). The fuel gas can be used to heat up the reactor vessel as described above. A fractionation column is commonly used in today's oil refineries and may be suitable for the conversion plant of large processing capacity. For the distributed plastic conversion plants at small processing capacity, the cooler/condenser and G/L separator drum as shown in FIG. 9 may be used, which can be prefabricated as compact equipment to reduce transportation and installation costs.

Various features of embodiment reactor apparatus are further elaborated by the following examples.

Example I. Promotional Effects of Catalyst on Plastic Decomposition

Figure 11:
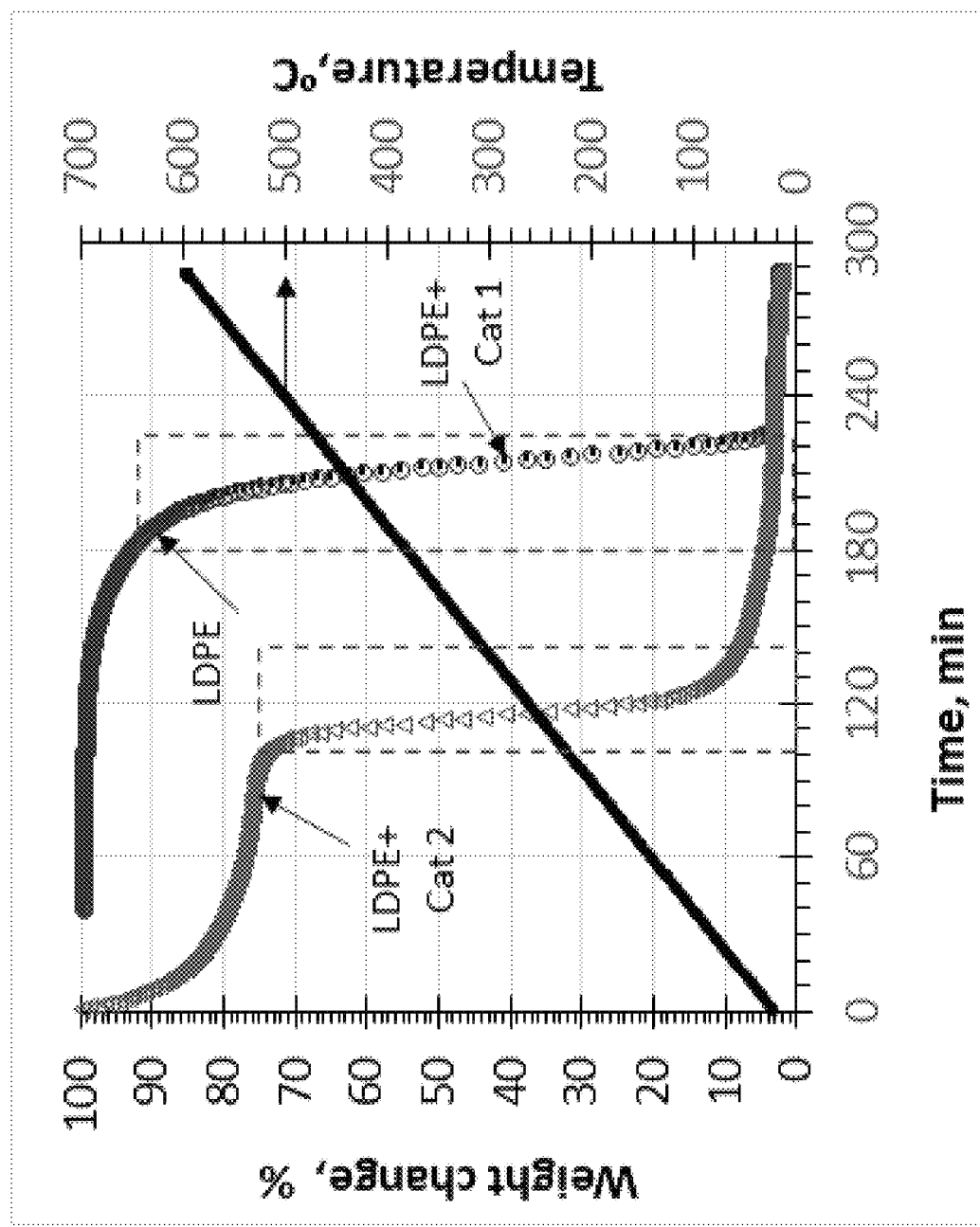
FIG. 11 is a plot illustrating the impact of catalyst addition on conversion of low-density polyethylene (LDPE) according to various embodiments.

Effects of catalyst addition on decomposition activity of the plastic were surveyed on thermogravimetric analyzer (TGA) by heating in nitrogen gas at 2° C./min. The trash bag made of low-density-polyethylene (LDPE) was cut into fragments of a few mm sizes and blended with dry ZSM-5 zeolite powder. FIG. 11 shows weight change profiles of bare LDPE and LDPE added with two different amounts of the catalyst. There was little weight change for the bare LDPE at temperatures below 350° C. When the temperature reached about 380° C., LDPE weight rapidly decreased. Most plastics decomposed within 40 min between 380 and 470° C. Addition of 3 wt. % catalyst (Cat 1) into the LDPE fragments did not make any difference. Because the LDPE fragment was very fluffy, it was not possible to obtain uniform mixing of the LPDE and catalyst powder at this loading level in physical mixing method. The catalyst powder was segregated from the plastic fragment. The catalytic effects could be not shown. In another trial, about 65 wt. % of the zeolite powder was mixed with the LDPE chip (Cat 2). The excess usage of the catalyst got the plastic covered by the catalyst. The plastic started decomposition upon heating. The decomposition was substantially completed over the temperature range of 220 to 320° C. within 40 min. The results show significant impacts of the zeolite catalyst addition on lowering LDPE decomposition temperature. The plastic should be in contact with the catalyst to make the catalytic cracking reaction prevail over thermal decomposition.

Figure 12:
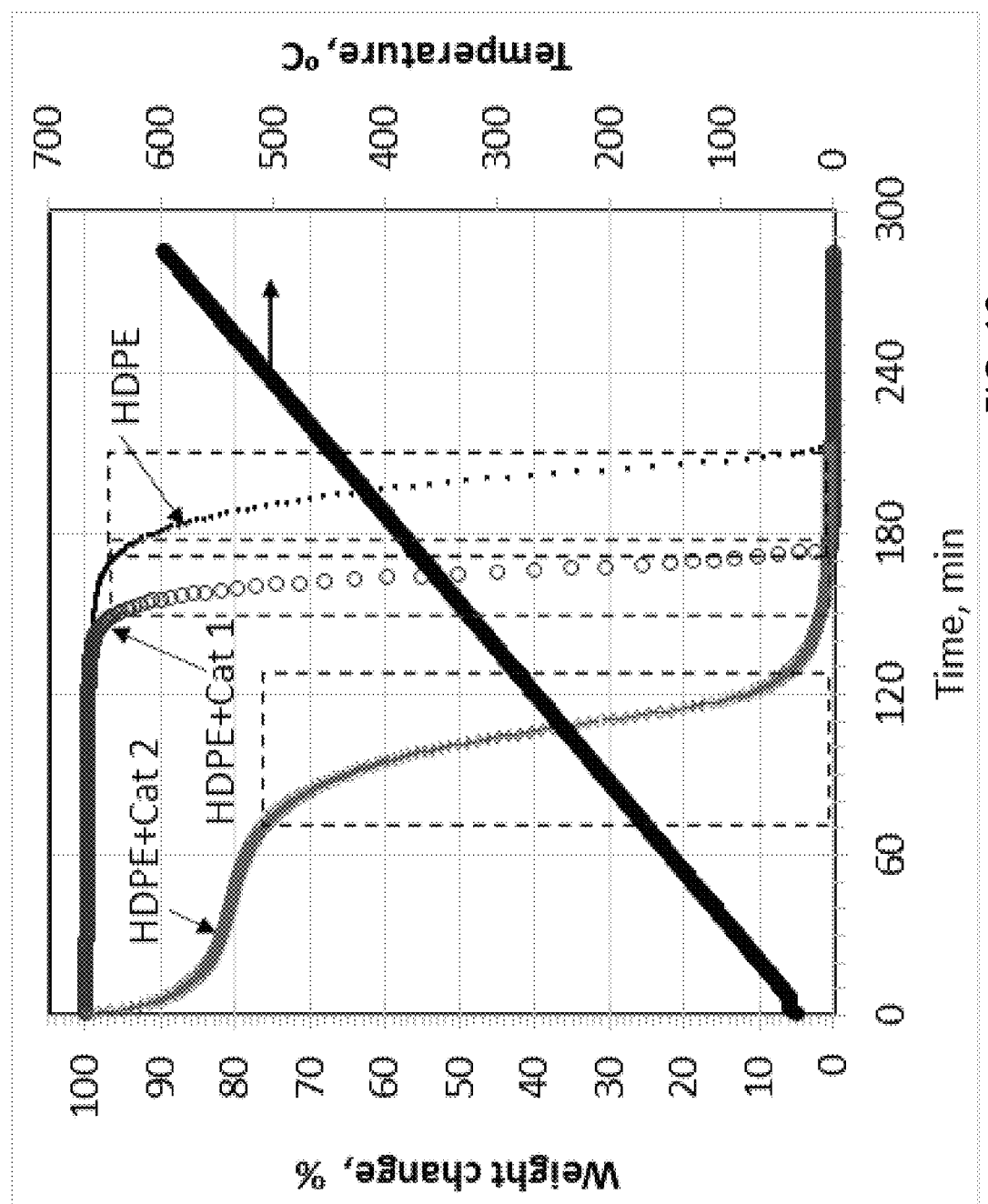
FIG. 12 is a plot illustrating the impact of catalyst addition on conversion of high-density polyethylene (HDPE) according to various embodiments.

The same ZSM-5 catalyst was used to study decomposition kinetics of high-density polyethylene (HDPE). A waste laboratory plastic bottle made of HDPE was cut into chips and ground with the catalyst powder. Because of its rigidity and thickness, the HDPE chips could be mixed much better with the catalyst powder than the LDPE material. TGA runs were conducted in the same way as the LDPE samples. The results are plotted in FIG. 12. Substantial decomposition of the bare HDPE occurred over the temperature range of 380 to 450° C. within 40 min. The decomposition temperature and time are comparable to the LDPE. The decomposition temperature was lowered to about 310° C. by mixing the HDPE with 5 wt. % zeolite powder (HDPE+Cat 1) and decomposition was nearly completed at about 370° C. The catalyst addition lowered the decomposition temperature by about 80° C. even at such a small amount. At the lower temperature, the decomposition was completed within 30 min, 10 min shorter than the bare HDPE. The dramatic catalytic effects with HDPE results from better mixing with the catalyst than the LDPE. In another trial, the HDPE was mixed with excess amount of the zeolite powder to assess impacts of the amount of the catalyst usage. Like LDPE+cat 2, the HDPE mixed with 65 wt. % the zeolite powder (HDPE+Cat 2) started decomposition upon heating. Most decomposition was completed over 180-300° C. within 60 min.

The testing results confirm that decomposition temperature of HDPE and LDPE can be dramatically lowered by use of the zeolite cracking catalyst. HDPE and LDPE have the same C—C molecular structures and thus, have the same intrinsic catalytic cracking kinetics. But HDPE and LDPE differ significantly in the physical properties, such as density and brittleness. HDPE is easier to mix with the catalyst powder than LDPE. Having intimate catalyst/plastic contacting aids in realizing catalytic cracking. The intimate catalyst/plastic contacting can be realized by i) using the catalyst particle of small sizes, ii) using an effective catalyst addition/mixing method and iii) increasing the catalyst/plastic ratio.

Example II. Baseline Tests of PE Reactivity in Tubular Reactor

Figure 13:
FIG. 13 is a photograph of plastic materials after heated in a catalytic reactor according to various embodiments.

Since small amounts of the material (~10 mg) were loaded on the sample pan in TGA tests, the material was nearly isothermal and had the temperature same or close to the sample pan temperature measured. In actual reactor operation, there could be significant temperature difference between the reactor temperature and actual material temperature. The reactivity of bare PE was tested in quartz tube reactor with the same LDPE and HDPE materials as used in Example I. The LDPE and HDPE were loaded in the respective ceramic boats, and the boats were placed inside a quartz tube reactor tube. Continuous nitrogen gas flow was used to purge inside the reactor tube while the outside of the reactor tube was heated by a furnace at 2° C./min to 450° C. with 60 min-hold at 450° C. It was observed that complete melting of LDPE and HDPE occurred at about 370° C. and 420° C., respectively. As listed in Table 1, the theoretical melting points for LDPE and HDPE are in the range of 180-270° C., which are much lower than the actual reactor temperature observed. No oil vapor formation was observed during 60-min hold at 450° C. After the reactor was cooled down and the tested samples were unloaded, FIG. 13 shows the LDPE and HDPE retrieved from the reactor. Both materials look like plastic. The LDPE got more densified after melting and re-solidification than the fresh fluffy chips. The left-over material weight was same as the fresh one. The tubular reactor testing results revealed large discrepancy from the TGA testing results that substantial decomposition of the LDPE and HDPE occurred over 380-470° C. within 40 min. The discrepancy is attributed to slow heat transfer from the reactor wall to the plastic in center of the reactor tube blanked by nitrogen gas.

Example III. Catalytic PE Conversion in the Tubular Reactor

Figure 14A:
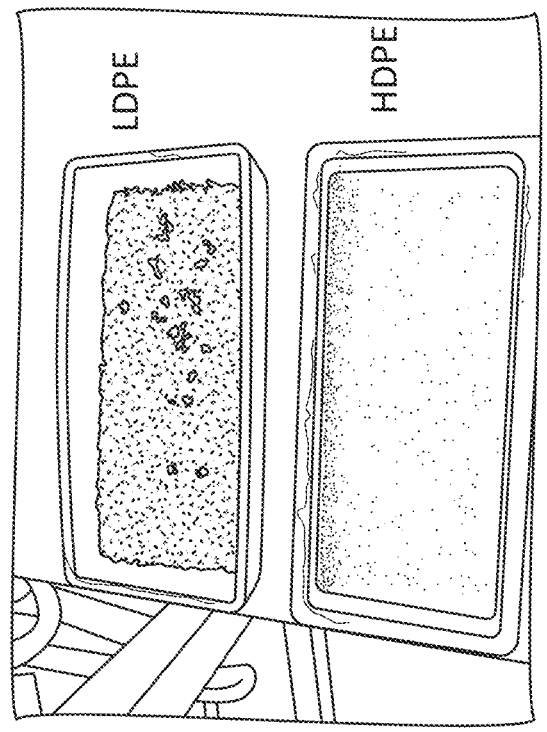
FIG. 14A is a photograph of condensed wax due to catalytic plastic conversion in the catalytic reactor according to various embodiments.
Figure 14B:
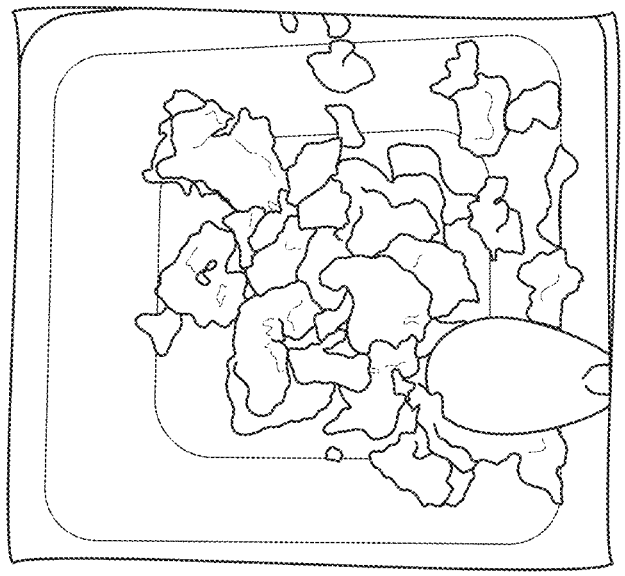
FIG. 14B is a photograph of leftover solid material due to catalytic plastic conversion in the catalytic reactor according to various embodiments.

Catalytic decomposition was tested in the same tubular reactor under the same conditions as example II. The LDPE and HDPE chips were physically mixed with about 5 wt. % zeolite catalyst powder, respectively. The catalyst-added LDPE and HDPE were placed in respective ceramic boats, and the boats were loaded in the tubular reactor. Some amounts of oil vapor were observed and collected at the reactor outlet during 450° C.-hold. After the heating was done and the reactor was opened, significant amounts of wax were found deposited on the reactor tube wall in the purge gas exit region. FIG. 14a shows the wax deposit collected. All the plastic materials in the two boats were gone (FIG. 14b). There was only catalyst powder in the ceramic boat. The catalyst in the HDPE boat looked grey, while the catalyst in the LDPE boat looks black. The dark color indicates coking on the catalyst. The plastics in both boats were cracked into wax molecules that left the ceramic boat and deposited on the reactor wall of lower temperature than the reaction zone. The LDPE was over-reacted so that the catalyst was coked. The catalytic reaction conditions (temperature, time) can be controlled appropriately to minimize catalyst coking. It is preferred that the catalyst is always immersed in molten plastic and/or liquid oil.

Figure 15A:
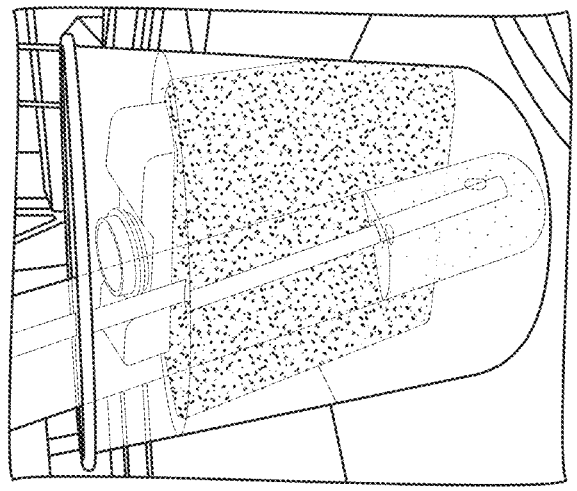
FIG. 15A is a photograph of oil vapor from a catalytic membrane filter according to various embodiments.
Figure 15B:
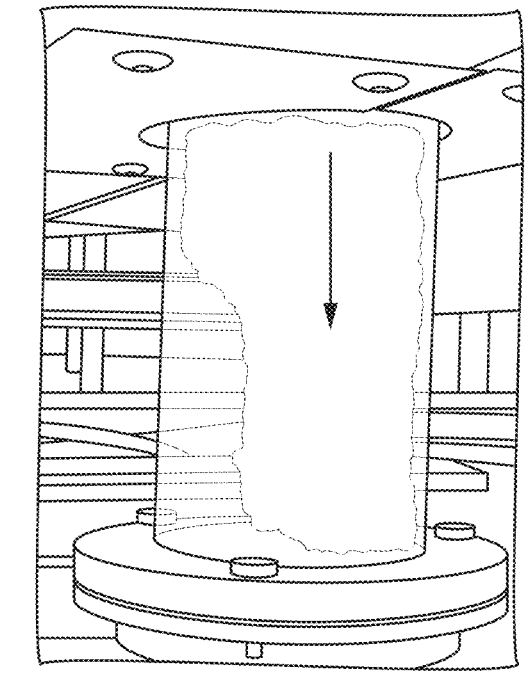
FIG. 15B is a photograph of condensed liquid fuel from a catalytic membrane filter according to various embodiments.

Example IV. Catalytic Cracking and Catalytic Filtering for Plastic Conversion in the Tubular Reactor The LDPE and HDPE were mixed with 5 wt. % zeolite catalyst powder and placed into respective ceramic boats in the same way as example III. In this example, a zeolite/porous metal sheet was used as a catalytic membrane filter to cover the ceramic boat. The membrane filter was prepared by spray-coating of a MoleculeWorks 50 μm-thin, porous nickel sheet with a solution comprised of 0.5 g nano-zeolite catalyst powder, 2 cc of 28 wt. % silica colloid, and 38 g of deionized water. The membrane-covered boats were loaded into the same tubular reactor as example III. The reactor was heated in nitrogen gas flow at 5° C./min to 300° C., then 2° C./min to 450° C., hold at 450° C. for 60 min. During 450° C.-hold, evolution of significant oil vapor was observed at the exit of the reactor tube (FIG. 15a). The vapor was condensed in a water bath as transparent liquid fuel (FIG. 15b). After the heating was completed, the reactor was opened. No wax deposit on the tube wall was observed. Instead, some liquid oil was condensed on the reactor wall, which looked the same as collected in the condenser (FIG. 15b). The membrane sheet on the ceramic boat was intact. No plastic residual was found inside the ceramic boat. The plastics was all converted. The example shows that the wax molecules produced from the catalytic pyrolysis inside the boat was cracked into the smaller molecules through the catalytic membrane. The catalytic membrane was permeable enough to pass the cracked vapor with a little pressure drop.

Example V. Catalytic Membrane Filter Preparation

The catalytic membrane is prepared by coating of nano-zeolite catalyst on a porous metal support sheet. 50 μm-thin, porous Ni sheets manufactured by Molecule Works Inc. is used as the support. The sheet has about 35-45% porosity and pore sizes of 0.1 to 0.8 μm. The coating solution is prepared by dispersing zeolite crystals of average size about 1000 nm into a solution. Dispersant and binder are added to obtain a homogenous and stable solution. The solution is spray-coated on the porous metal sheet to form a coating layer (<5 μm). The coated sheet is dried and may be further treated to enhance coating adhesion using one of the two methods. The first method is hydrothermal growth. The coated sheet is immersed in a zeolite growth solution to form inter-growth of the zeolite crystals coated under proper growth conditions. The second method is thermal sintering of the coating layer. Zeolite crystals cannot be sintered together by heating. The binder in the coating matrix may be sintered by heating at high temperatures. FIG. 16a show surface morphologies of the zeolite/metal sheet membrane. The metal sheet support provides uniform surface pore structures of pore sizes at sub-micrometer. The coating layer has much finer pores than the support.

Figure 16B:
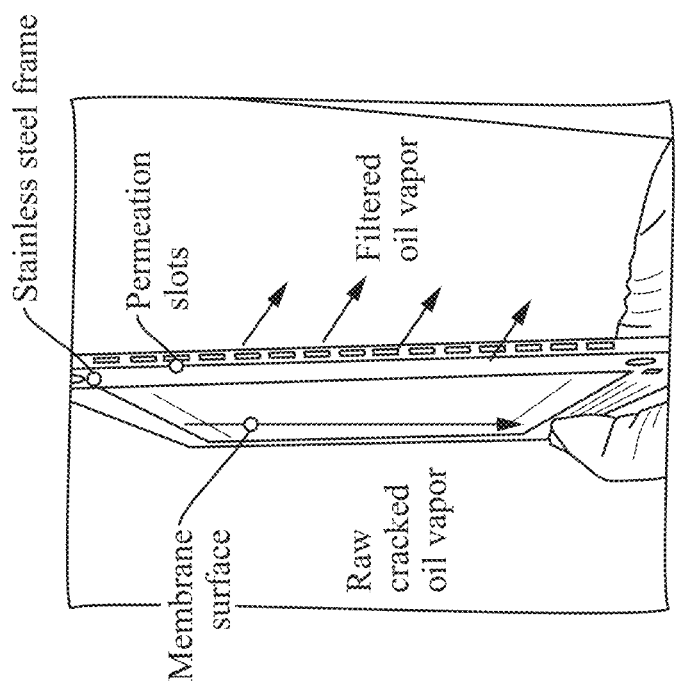
FIG. 16B is a photograph of a catalytic membrane cassette according to various embodiments.
Figure 16A:
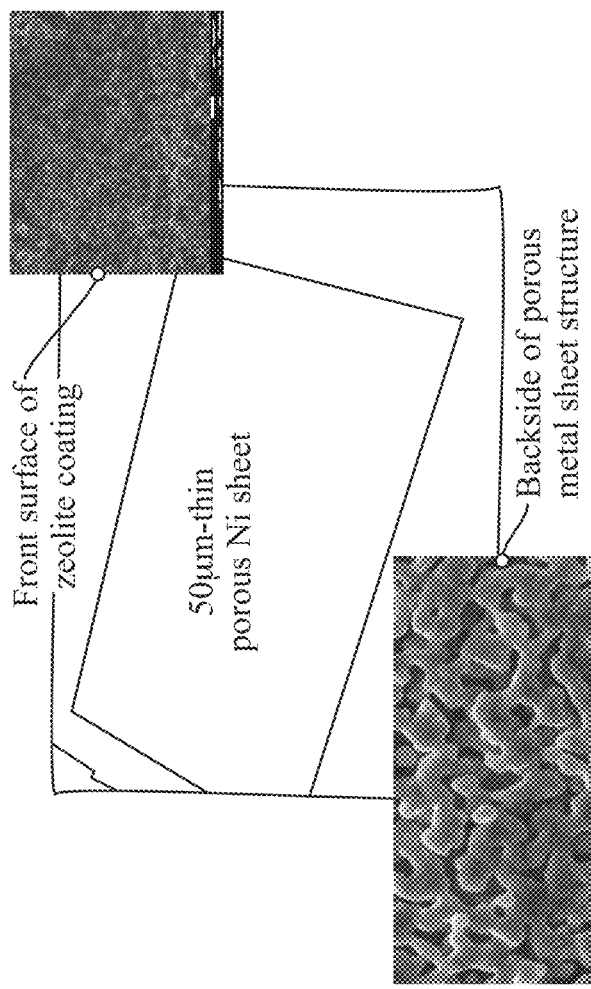
FIG. 16A is a photograph of a zeolite coated nickel porous sheet for use in a catalytic membrane filter.

Two membrane sheets can be bonded to a stainless-steel frame to form a membrane cassette (FIG. 16b). In an embodiment, there may be permeation channels inside the frame. Two arrays of permeation slots may be made on the two-opposite side of the frame to let the permeate flow out of the membrane cassette. For practical applications, a group of such membrane cassettes can be assembled to form a module. The stainless frame and the metal sheet membrane provide thermal shock resistance so that the mechanical structural integrity can be maintained during heating up and cooling down.

The cassette-type membrane filter provides a smooth and flat membrane surface exposed to the raw cracked oil vapor probably laden with particulates and liquid oil droplets. As the oil vapor permeates through the membrane pore, the particulates excluded by the membrane pore may fall off the membrane surface by gravity.

Example VI. Reactor Apparatus for Conversion of Plastic Wastes into Liquid Fuels A reactor vessel of inner diameter 100 cm and total height 200 cm is made of 304 stainless steel in a cylindrical form. Lengths of the bottom, middle and top sections are 40, 100, and 60 cm, respectively. The bottom, middle, and top sections serve as the solid collection, catalytic reaction zone, and gas space, respectively. A non-Newtonian stirrer is installed along the centerline of the reactor vessel with the electrical motor located top of the reactor vessel. The motor has a power capacity of 20 kW and variable speed controller. Five sets of counterflow blades are arranged in the reaction zone at heights of 40 cm, 65 cm, 90 cm, 115 cm, and 140 cm, respectively. One 8-point thermocouple probe is inserted into the reactor vessel to measure temperatures at heights of 15, 40, 65, 90, 115, 140, 165, and 190 cm, respectively. One feed introduction port is located at the reactor height of 150 cm. A screw feeder is connected to the feed port via a feedline that is preheated to 300° C. The oil vapor exit port is located at the reactor height of 170 cm. The oil exit port is connector to a catalytic membrane filter of membrane working area of 4 m². The membrane filter is installed in the free space of the top section of the reactor vessel, 10 cm above the plastic feed introduction height. The catalytic membrane filer provides straight and open channels for the cracked oil vapor to flow in and for the particulates to fall back to the reaction zone. The external surface of the reactor vessel is heated by three jackets of the catalytic oxidation heaters positioned in the bottom, middle, and top sections, respectively. The heater jacket external surface is insulated so that the external surface temperature is not more than 60° C. under reaction conditions. The jacket heater temperature is controlled by fuel gas flow rate.

Prior to the reactor startup, the reactor bottom and reaction zone are filled with Y-type zeolite powder and oil mixtures. Volume ratio of the catalyst to the oil is about 0.1/0.8. The exterior of the reactor vessel has a heating jacket comprising catalytic oxidation channels. The Y-zeolite powder is substantially free of large agglomerates so that the particle is uniformly suspended in the oil and molten plastics upon stirring. The reactor is started up by introducing fuel gas and air into the catalytic jacket heater while the reaction zone is under stirring at 45 RPM. When the reaction zone temperature reaches about 300° C. and the oil vapor emerges at the reactor effluent, catalyst+plastic feedstock is introduced into the reactor vessel. The feedstock consists of about 38% PP, 30% LDPE, 30% HDPE, and 2% other materials by weight, which is cut into the sizes less than 10 mm. The Y-type zeolite powder is milled to average size of about 1 micrometer and dispersed in diesel oil as homogenous slurry. The catalyst slurry is sprayed to the plastic feed so that the catalyst particle is uniformly dispersed in the plastic matrix at weight loading about 2 wt. %. The feedline is preheated to 250° C. The feed rate is gradually increased as the reaction zone is heated up to keep the catalyst+liquid reaction zone below the feed inlet port. When the reaction zone is stabilized at about 450° C., the feed rate is kept constant to reach steady-state reactions. The reactor pressure is monitored and maintained below 3 barg, and preferably below 2 barg.

Under the stead-state reaction conditions, the plastic feed rate is maintained at about 790 kg/h. The reactor effluent is first cooled down to about 180° C. to condense the liquid fuel within boiling range of diesel fuel. The remaining oil vapor is further cooled down to 30° C. to condense the liquid fuel within boiling range of gasoline. The non-condensable gas is sent to the catalytic jacket heater. The diesel fuel, gasoline fuel, and fuel gas production rates are 300, 370, and 79 kg/h, respectively. The deactivated catalyst and inert solid residuals are discharged from the reactor bottom at a rate of about 55 kg/h. This reactor unit has a liquid fuel production capacity about 120 barrel per day (BPD).

Referring to all drawings and according to various embodiments of the present disclosure, a catalytic reactor for conversion of hydrocarbon solids into liquid fuels is provided. The catalytic reactor may include: a reactor vessel 1 having a top portion, a bottom portion and molten plastic and catalyst reaction zone 3 located between the top portion and the bottom portion and an aspect ratio greater than 1; a non-Newtonian mixing device 5 located along a centerline of the reactor vessel, the non-Newtonian mixing device 5 configured to introduce radial flow mixing in the molten plastic and catalyst reaction zone 3; at least one feed port above the molten plastic and catalyst reaction zone 3 configured to introduce a hydrocarbon solid feedstock into the reactor vessel 1; at least one outlet port 9 in the top portion of the reactor vessel 1 configured to discharge of hot oil vapor gas to outside of the reactor vessel 1; a free space in the top portion of the reactor vessel 1 for settlement of the solid matter entrained by the oil vapor; a filter 8 configured to remove solid particulates from the hot oil vapor; a jacket heater 6 operatively connected to an external wall of the reactor vessel 1; and at least one bottom portion port (10, 11) located in the bottom portion configured to discharge solid materials and/or for introduction of purge gas.

In one embodiment of the catalytic reactor, the catalytic reactor may further include at least one top portion port (12, 13) located on the reactor vessel 1 configured for insertion of thermocouples for measurement of temperature profiles inside the reactor vessel 1. In one embodiment, the catalytic reactor may further include at least one top portion port (12, 13) on the reactor vessel 1 configured to allow measurement of reactor pressure. In one embodiment, the filter 8 may comprise a metallic or ceramic membrane filter configured for removal of particulates down to one micrometer. In one embodiment, the non-Newtonian mixing device 5 may comprise an array of non-Newtonian blades fixed on a shaft. In one embodiment, the filter 8 may comprise cracking catalysts for cracking of liquid hydrocarbon oil or waxes into oil vapor. In one embodiment, the jacket heater 6 may comprises catalytic oxidation channels having of channel widths in the range of 0.5 to 5 mm. In one embodiment, the top portion of the reactor vessel may comprise free space and the top portion may comprise 15-40% of a height of the reactor vessel. In one embodiment, the molten plastic and catalyst reaction zone 3 of the reactor vessel 1 may comprise 40-60% of a height of the reactor vessel 1. In one embodiment, the non-Newtonian mixing device may comprise a coating of ceramic material. In one embodiment, the catalytic reactor may comprise a coating of ceramic material applied to an inner wall of the reactor vessel.

Figure 17:
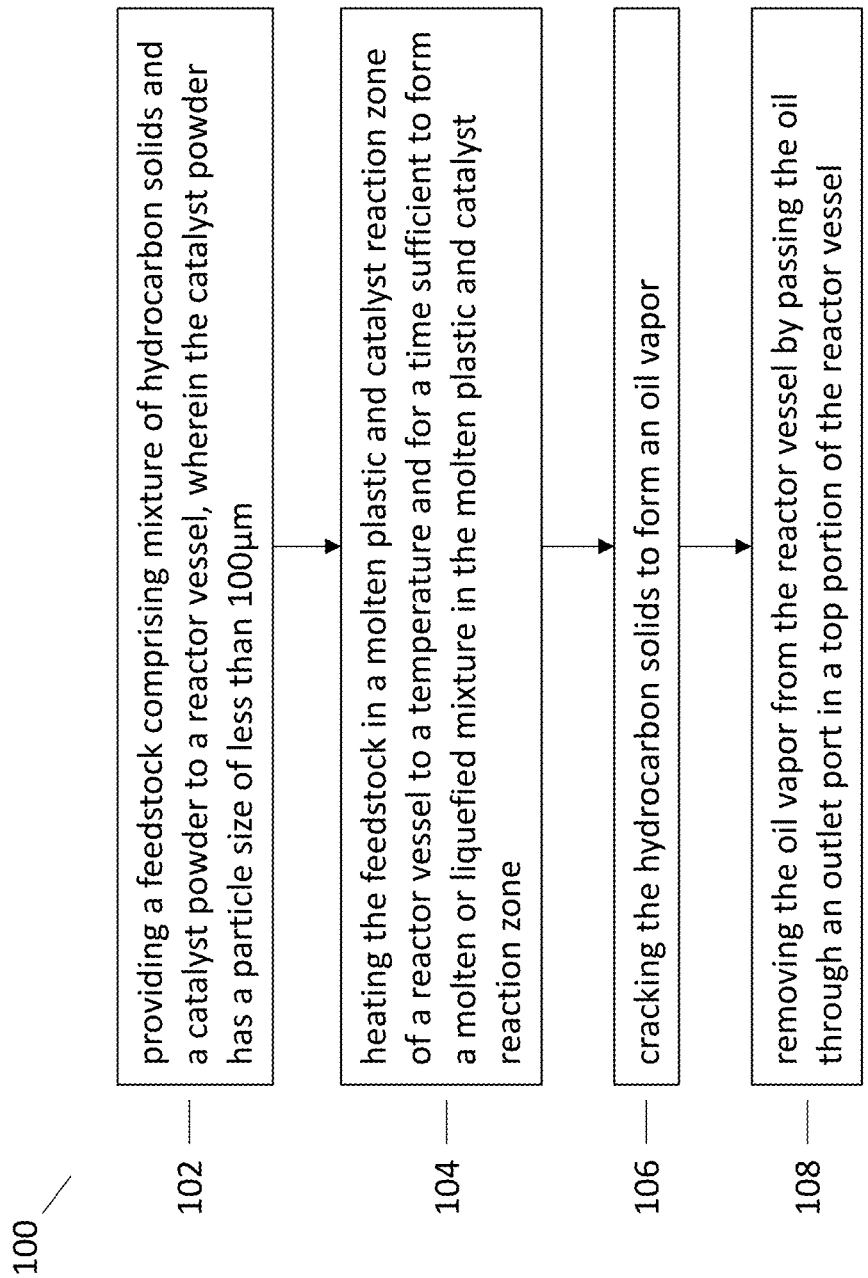
FIG. 17 is a flow diagram illustrating a method of making liquid fuels from hydrocarbon solids according to various embodiments.

Referring to FIG. 17, a general method 100 of making liquid fuels from hydrocarbon solids is described. Referring to step 102, the general method 100 includes providing a feedstock comprising mixture of hydrocarbon solids and a catalyst powder to a reactor vessel 1, wherein the catalyst powder has a particle size of less than 100 μm. Referring to step 104, the general method 100 includes heating the feedstock in a molten plastic and catalyst reaction zone 3 of a reactor vessel 1 to a temperature and for a time sufficient to form a molten or liquefied mixture in the molten plastic and catalyst reaction zone 3. Referring to step 106, the general method includes cracking the hydrocarbon solids to form an oil vapor. Referring to step 108, the general method includes removing the oil vapor from the reactor vessel 1 by passing the oil through an outlet port 9 in a top portion of the reactor vessel 1.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A method of filtering an oil vapor produced by conversion of plastic, the method comprising:
   providing an oil vapor to a filter comprising a porous catalytic membrane;
   filtering plastic fragments and macromolecules from the oil vapor by a plurality of pores in the porous catalytic membrane; and
   cracking liquid oil and wax in the oil vapor by a catalyst material on the porous catalytic membrane.

2. The method of claim 1, wherein the providing of the oil vapor to the filter comprises providing the oil vapor at a temperature in a range from 200° C. to 600° C.

3. The method of claim 1, wherein the providing of the oil vapor to the filter comprises providing an oil vapor produced by catalytic cracking, thermal cracking, pyrolysis or thermochemical conversion of macromolecules including molecules that comprise carbon-carbon bonds.

4. The method of claim 3, wherein the macromolecules comprise a plastic molecule.

5. The method of claim 1, wherein the cracking of the liquid oil and wax comprises contacting the oil vapor to the catalyst material for a residence time that is less than 1.0 second.

6. The method of claim 1, wherein the cracking of the liquid oil and wax comprises contacting the oil vapor to the catalyst material for a residence time that is less than 0.1 seconds.

7. The method of claim 1, further comprising:
   backflushing the filter with a backflush gas comprising one of steam, fuel gas and nitrogen gas.

8. The method of claim 1, further comprising:
   backflushing the filter with a backflush gas comprising an oxygen-containing gas.

9. The method of claim 1, further comprising:
   cooling the oil vapor to produce a hydrocarbon product that is a liquid at room temperature.

10. The method of claim 1, wherein the porous catalytic membrane comprises one of a porous metal membrane, a porous ceramic membrane, or a porous hybrid ceramic/metal membrane loaded with a cracking catalyst.

11. The method of claim 1, wherein the porous catalytic membrane includes first pores in the catalytic membrane layer having a first pore size of less than 1 μm, and wherein the filtering of the plastic fragments and macromolecules from the oil vapor comprises filtering the plastic fragments and macromolecules by the first pores.

12. The method of claim 11, wherein the porous catalytic membrane further comprises a catalytic membrane layer and a porous support structure supporting the catalytic membrane layer, and wherein cracking of the liquid oil and wax comprises cracking the liquid oil and wax in the porous support structure.

13. The method of claim 1, wherein the catalyst material porous catalytic membrane further comprises a porous support structure and a plurality of catalyst particles dispersed in a coating on the porous support structure, and wherein the method further comprises:
   cracking the plastic fragments and macromolecules and the liquid oil and wax by the plurality of catalyst particles dispersed in the coating.

14. The method of claim 12, wherein the plurality of pores include second pores in the porous support structure, the second pores having a second pore size greater than the first pore size, and wherein the cracking of the liquid oil and wax comprises cracking the liquid oil and wax in the second pores.

15. The method of claim 14, wherein the catalyst material comprises a plurality of catalyst particles in the second pores of the porous support structure, and wherein cracking of the of the liquid oil and wax comprises cracking the liquid oil and wax by the plurality of catalyst particles in the second pores.

16. A method of filtering an oil vapor, the method comprising:
   providing an oil vapor produced by conversion of plastic from inside a reactor vessel to a filter located at a top portion of the reactor vessel, the filter comprising a porous membrane comprising:
      a catalytic membrane layer including a plurality of first pores having a first pore size; and
      a porous support structure supporting the catalytic membrane layer and including a plurality of second pores having a second pore size greater than the first pore size;
   filtering particulates, plastic fragments and macromolecules in the oil vapor by the plurality of first pores in the catalytic membrane layer;
   cracking plastic fragments in the oil vapor in the plurality of first pores in the catalytic membrane layer; and
   cracking liquid oil and waxes in the oil vapor passed through the plurality of first pores by a plurality of catalyst particles in the plurality of second pores in the porous support structure.

* * * * *